US012579444B2

(12) United States Patent
Han et al.

(10) Patent No.: US 12,579,444 B2
(45) Date of Patent: Mar. 17, 2026

(54) MACHINE LEARNING MODEL GENERATION AND UPDATING FOR MANUFACTURING EQUIPMENT

(71) Applicant: Applied Materials, Inc., Santa Clara, CA (US)

(72) Inventors: Pengyu Han, Fremont, CA (US); Hong-Rui Chen, Taichung City (TW); Shu-Yu Chen, Zhubei City (TW); Wan-Hsueh Lai, New Taipei City (TW); Pin Ham Lu, Taipei (TW); Zhengping Yao, Cupertino, CA (US)

(73) Assignee: Applied Materials, Inc., Santa Clara, CA (US)

( * ) Notice: Subject to any disclaimer, the term of this patent is extended or adjusted under 35 U.S.C. 154(b) by 939 days.

(21) Appl. No.: 17/668,280

(22) Filed: Feb. 9, 2022

(65) Prior Publication Data

US 2023/0306281 A1 Sep. 28, 2023

(51) Int. Cl.
G06N 5/022 (2023.01)
G05B 13/02 (2006.01)

(52) U.S. Cl.
CPC ........... G06N 5/022 (2013.01); G05B 13/029 (2013.01)

(58) Field of Classification Search
CPC ........ G06N 5/022; G06N 3/044; G06N 20/00; G06N 3/0464; G06N 20/20; G05B 13/029;

(Continued)

(56) References Cited

U.S. PATENT DOCUMENTS

2018/0136617 A1  5/2018  Xu et al.
2020/0012584 A1  1/2020  Walters et al.
(Continued)

FOREIGN PATENT DOCUMENTS

EP        3901700 A1   10/2021
WO     2020078818 A1    4/2020
(Continued)

OTHER PUBLICATIONS

Chawla, Nitesh & Bowyer, Kevin & Hall, Lawrence & Kegelmeyer, W.. (2002). SMOTE: Synthetic Minority Over-sampling Technique. J. Artif. Intell. Res. (JAIR). 16. 321-357. 10.1613/jair.953. (Year: 2002).*

(Continued)

*Primary Examiner* — Van C Mang
(74) *Attorney, Agent, or Firm* — Lowenstein Sandler LLP

(57) ABSTRACT
A method includes determining that conditions of a processing chamber have changed since a trained machine learning model associated with the processing chamber was trained. The method further includes determining whether a change in the conditions of the processing chamber is a gradual change or a sudden change. Responsive to determining that the change in the conditions of the processing chamber is a gradual change, the method further includes performing a first training process to generate a new machine learning model. Responsive to determining that the change in the conditions of the processing chamber is a sudden change, the method further includes performing a second training process to generate the new machine learning model. The first training process is different from the second training process.

20 Claims, 6 Drawing Sheets

(58) Field of Classification Search
CPC .......... G05B 13/0265; H01L 21/67063; H01L 21/67242
See application file for complete search history.

(56) References Cited

U.S. PATENT DOCUMENTS

| | | | |
|---|---|---|---|
| 2020/0151619 A1 | 5/2020 | Mopur et al. | |
| 2021/0055699 A1 | 2/2021 | Agarwal et al. | |

FOREIGN PATENT DOCUMENTS

| | | | |
|---|---|---|---|
| WO | 2021044192 A1 | 3/2021 | |
| WO | 2021154747 A1 | 8/2021 | |

OTHER PUBLICATIONS

C. -Y. Lee, C. -S. Wu and Y. -H. Hung, "In-Line Predictive Monitoring Framework," in IEEE Transactions on Automation Science and Engineering, vol. 18, No. 4, pp. 1668-1678, Oct. 2021, doi: 10.1109/TASE.2020.3014177. (Year: 2021).*

S. Maung, S. Banerjee, D. Draheim, S. Henck and S. W. Butler, "Integration of in situ spectral ellipsometry with MMST machine control," in IEEE Transactions on Semiconductor Manufacturing, vol. 7, No. 2, pp. 184-192, May 1994, doi: 10.1109/66.286854. (Year: 1994).*

International Search Report and Written Opinion for International Application No. PCT/US2022/053559, mailed Feb. 2, 2023, 8 Pages.

International Search Report and Written Opinion for International Application No. PCT/US2023/022131, mailed Nov. 20, 2023, 11 Pages.

* cited by examiner

MACHINE LEARNING MODEL GENERATION AND UPDATING FOR MANUFACTURING EQUIPMENT

TECHNICAL FIELD

The present disclosure relates to methods associated with training and use of machine learning models for making estimates and/or predictions associated with at least one of processing chambers or processes run on processing chambers.

BACKGROUND

Products may be produced by performing one or more manufacturing processes using manufacturing equipment. For example, semiconductor manufacturing equipment may be used to produce substrates via semiconductor manufacturing processes. Products are to be produced with particular properties, suited for a target application. Machine learning models are used in various process control and predictive functions associated with manufacturing equipment. Machine learning models are trained using data associated with the manufacturing equipment.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In an aspect of the disclosure, a method includes determining that conditions of a processing chamber have changed since a trained machine learning model associated with the processing chamber was trained. The method further includes determining whether a change in the conditions of the processing chamber is a gradual change or a sudden change. Responsive to determining that the change in the conditions of the processing chamber is a gradual change, the method further includes performing a first training process to generate a new machine learning model. Responsive to determining that the change in the conditions of the processing chamber is a sudden change, the method further includes performing a second training process to generate the new machine learning model. The first training process is different from the second training process.

In another aspect of the disclosure, a system including memory and a processing device coupled to the memory is disclosed. The processing device is configured to perform operations, including determining that conditions of a processing chamber have changed since a trained machine learning model associated with the processing chamber was trained. The trained machine learning model is configured to receive as input sensor data associated with a process of the processing chamber and produce as output a first indication of performance of the processing chamber. The operations further include determining whether a change in the conditions of the processing chamber is a gradual change or a sudden change. Responsive to determining that the change in the conditions of the processing chamber is a gradual change, the operations further include performing a first training process to generate a new machine learning model.

Responsive to determining that the change in the conditions of the processing chamber is a sudden change, the operations further include performing a second training process to generate the new machine learning model. The second training process is different from the first training process.

In another aspect of this disclosure, a non-transitory machine-readable storage medium is disclosed. The medium stores instructions which cause a processing device to perform operations. The operations include determining that conditions of a processing chamber have changed since a trained machine learning model associated with the processing chamber was trained. The trained machine learning model is configured to receive as input data associated with one or more processing operations of the processing chamber and produce as output predictive data associated with the processing chamber. The operations further include determining whether a change in the conditions of the processing chamber is a gradual change or a sudden change. Responsive to determining that the change in the conditions of the processing chamber is a gradual change, the operations further include performing a first training process to generate a new trained machine learning model. Responsive to determining that the change in the conditions of the processing chamber is a sudden change, the operations further include performing a second training process to generate the new machine learning model. The second training process is different from the first training process.

BRIEF DESCRIPTION OF THE DRAWINGS

The present disclosure is illustrated by way of example, and not by way of limitation in the figures of the accompanying drawings.

DETAILED DESCRIPTION

Figure 1:
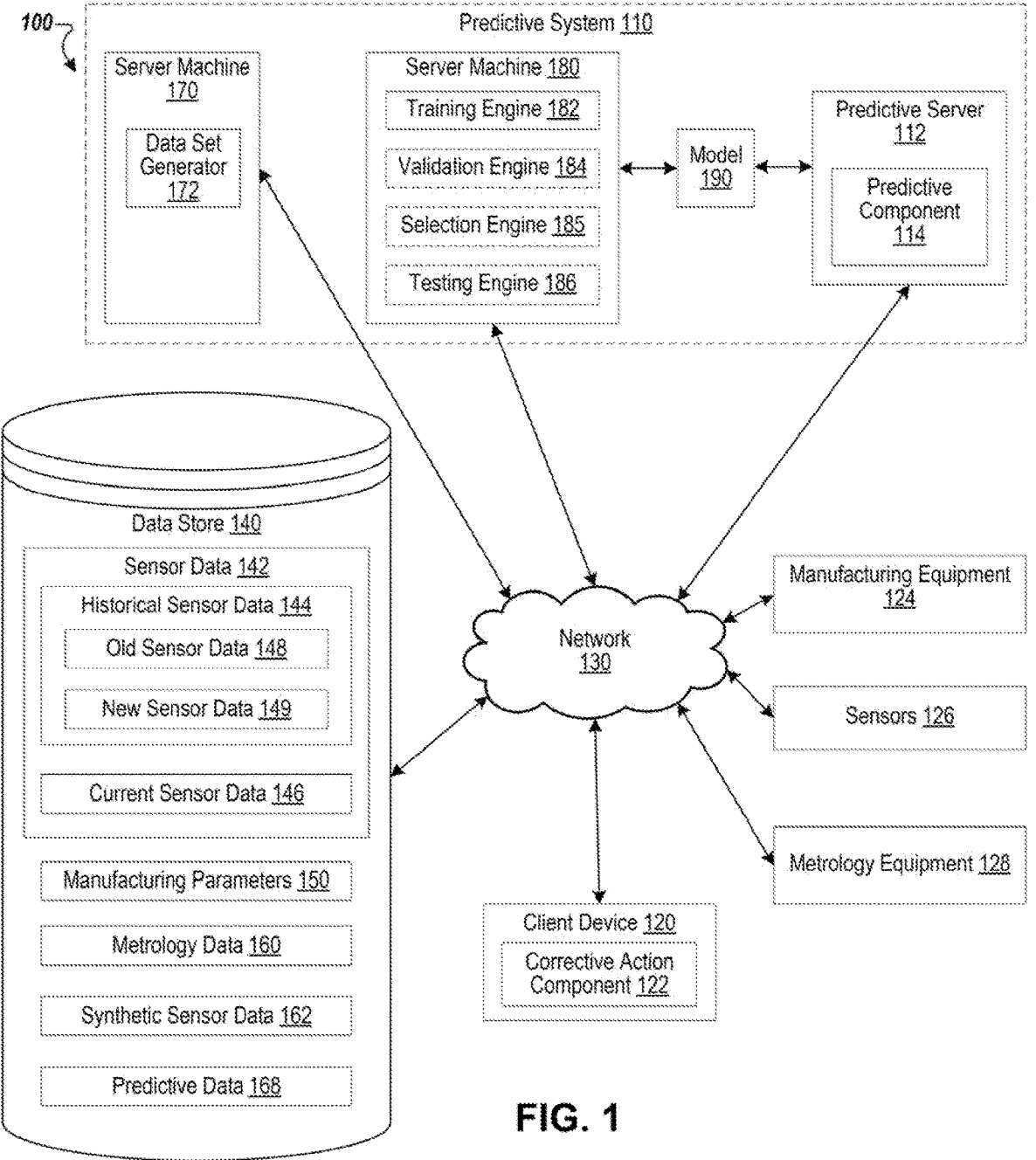
FIG. 1 is a block diagram illustrating an exemplary system architecture, according to some embodiments.

Described herein are technologies related to updating machine learning models associated with manufacturing equipment. Manufacturing equipment may be used to produce products, such as substrates (e.g., wafers, semiconductors). Manufacturing equipment often includes a manufacturing chamber that separates the substrate being processed from the environment. The properties of the produced substrates are expected to meet target property values in order to facilitate specific functionalities. Manufacturing parameters are to be selected to attempt to produce substrates that meet target property values. There are many manufacturing parameters (e.g., hardware parameters, process parameters, etc.) that contribute to the properties of the resulting substrates. Manufacturing systems control such parameters by specifying a set point for a property value and receiving data from sensors disposed within the manufacturing chamber, making adjustments to the manufacturing equipment until the sensor readings match the set point. In some cases, trained machine learning models are utilized to improve performance of manufacturing equipment.

Machine learning models may be applied in several ways associated with processing chambers, manufacturing equipment and/or processes run on such processing chambers and/or manufacturing equipment. A machine learning model may receive as input sensor data that includes measurement values of properties in a processing chamber. The machine learning model may be configured to predict process results, e.g., metrology results of the finished product. A machine learning model may receive as input in-situ data associated with the work piece or substrate, e.g., reflectance spectroscopy of a semiconductor wafer during an etch process. The machine learning model may be configured to predict and control process results, e.g., may predict when an etch process is completed and send instructions to the processing chamber to stop the etch operation. In some embodiments, a machine learning model may accept as input metrology data of a finished product. The machine learning model may be configured to produce as output a prediction of a root cause (e.g., processing fault) of an anomaly of the product. These are a few representative examples of the uses of machine learning in association with manufacturing equipment, among many others.

Performance of manufacturing equipment changes over time. In some processes, materials may be deposited on chamber components as products are processed, e.g., substrate supports, valves and actuators, showerheads, etc., may accumulate layers of various processing materials or byproducts. In some processes, material may be removed from various chamber components, e.g., by a corrosive gas or plasma. As components of a manufacturing system gradually change, conditions experienced by the work piece (e.g., substrate, semiconductor wafer, etc.) may be affected. Properties of finished products (e.g., substrate metrology) may also shift with changing conditions.

To avoid unpredictable chamber conditions, maintenance is performed on processing equipment. In some cases, one or more components are replaced. In some cases, seasoning operations are performed. Some maintenance operations are performed as part of planned maintenance events, e.g., maintenance events performed according to a schedule to maintain acceptable performance of equipment. Some maintenance operations are performed as part of unplanned maintenance events, e.g., maintenance events initiated responsive to a system fault, unexpected system or component failure, etc.

Slow drift and sudden changes (e.g., maintenance, component replacement, etc.) may alter a relationship between set points and property values in a processing chamber. For example, as a chamber ages or if a heating element is replaced, a set point for the heater (e.g., power provided to the heater) may result in a different temperature profile at the location of a substrate. In some embodiments, the relationship between sensor data and conditions proximate to the substrate may be affected by a change in the processing chamber. Machine learning models trained to perform functions associated with processing equipment (e.g., generating predictive data) may provide less reliable functionality as chamber conditions change.

Training a machine learning model may be expensive. A machine learning model may be trained with a large number of data samples. For example, a machine learning model may be configured to receive, as input, sensor data and produce, as output, a prediction of metrology of a finished product. In training the machine learning model, metrology data and associated sensor data of many (e.g., hundreds) of products (e.g., substrates) may be provided to the machine learning model. A trained machine learning model may only provide useful (e.g., accurate) data for a narrow range of situations. For example, a trained machine learning model may only be applicable to one processing chamber, one substrate design, one process recipe, etc. Producing enough data to train a machine learning model may involve significant expenditure, e.g., in raw materials, processing time, energy, reagents, equipment wear and tear, expenditure to generate metrology data, etc. While generating training data, processing equipment may be operated without the protection of predictive data from one or more machine learning models. Processing equipment may be operated at conditions which increase wear on components without predictive machine learning data. The lifetime of components may be decreased by being operated in sub-optimal conditions.

The expense of generating sufficient training data to produce a trained machine learning model with appreciable predictive power is compounded by changing chamber quality, e.g., due to drift, maintenance, etc. As chamber quality changes (e.g., as components experience drift, are replaced, etc.), predictive power of machine learning models associated with the processing chamber may deteriorate. To maintain adequate predictive power, the machine learning models may be retrained. Data from further product processing, metrology, etc., may be utilized for training the machine learning models. Such a strategy involves generating a large amount of training data for the altered processing chamber. The chamber may be offline (e.g., may not be producing products for use, for sale, etc.) while generating the new training data. A processing system may undergo changes regularly. The offline time (e.g., downtime to generate training data) may become inconvenient or expensive.

The methods and devices of the present disclosure may address one or more of these deficiencies of conventional solutions. In some embodiments, a chamber condition or quality experiences a change. One or more trained machine learning models are associated with the processing chamber. Retraining data may be generated to retrain a machine learning model, generate a new machine learning model, etc., with higher predictive power (e.g., generates more accurate predictions) for the altered chamber than the old model. Retraining data may be generated using a small number of new processing runs, e.g., fewer wafers may be produced for generating a training dataset for a machine learning model associated with the altered chamber than were used for training the machine learning model associated with the unaltered chamber.

In some embodiments, processing equipment may experience a gradual change. Accuracy of predictions of one or more associated machine learning models may deteriorate slowly (e.g., over the course of many processing runs). In some embodiments, data may be collected from the altered chamber (e.g., during normal processing runs, during processing runs dedicated to collecting training data, etc.). In some embodiments, the original training data (e.g., the training data used to train the machine learning model associated with the unaltered chamber) may include information associated with a variety of chamber conditions (e.g., due to random variation of the large number of samples). The newly produced data (e.g., from processing runs performed after the chamber alterations) may not include information associated with a wide variety of chamber conditions (e.g., due to the smaller number of processing runs). One or more machine learning models may be trained (e.g., generating a new trained machine learning model, retraining the original machine learning model to generate a new trained machine learning model, etc.) using both some data from before the chamber alteration and some data from after the chamber alteration. In the case of a gradual change, the distinctions "before" and "after" an alteration may not be clearly defined. Within this disclosure, unless indicated otherwise, the distinction between before and after an alteration indicates a time (e.g., a processing run) after which the performance of one or more machine learning models drops below a threshold. In some embodiments, several time periods may be specified, e.g., as a machine learning models passes various performance thresholds, as different machine learning models pass performance thresholds, etc. In some embodiments, new and old data are both provided to train a new machine learning model. In some embodiments, more recent data (e.g., data produced after an alteration to the processing chamber, data produced after a machine learning model's performance drops below a threshold, etc.) is given more weight (e.g., has a higher impact on training) than older data. In this way, the variety of data associated with old data (e.g., the data used to train the original machine learning models) and the new features from data associated with the altered chamber may both be captured by the machine learning model. In some embodiments, data from a number of time periods (e.g., more than two) may be provided to train a new machine learning model. In some embodiments, more recent data may be given more weight than older data.

In some embodiments, a processing chamber may experience a sudden change. A sudden change may include a maintenance event, a seasoning event, replacing one or more components, etc. In some embodiments, a small amount of data from after the sudden change (e.g., data from fewer processing runs than was used to train the original machine learning model) is available for training a new machine learning model. In some embodiments, synthetic data may be generated for training the new machine learning model. In some embodiments, the synthetic data may include features of both the old data (e.g., data generated before the chamber alteration, data used to train the original machine learning model, etc.) and the new data (e.g., data generated after the chamber alteration). The training data may include the variety of the original training data and the new information (e.g., new relationships between components, chamber conditions, etc.) of the alteration to the processing chamber. In some embodiments, a portion of training data (e.g., one training time trace, training data representing one virtual processing run, etc.) may be generated using both old data and new data. In some embodiments, synthetic data is generated using a combination of old and new data. In this way, features of the old data set (e.g., volume of data) and desirable features of the new data set (e.g., representation of chamber conditions as they exist after the chamber alteration) may both be captured by the new training data. Features of the old data set and the chamber alterations may both be captured by the new trained machine learning model.

Aspects of the present disclosure result in technological advantages compared to conventional solutions. Aspects of the present disclosure result in more efficient machine learning model training data generation. Training of a machine learning model may be performed with a large amount of data. As chamber quality is altered, training a new machine learning model (for example, by retraining the old machine learning model) may be performed. Training a new machine learning model may also be performed with a large amount of data. In conventional systems, a large number of new processing runs may be performed to generate the new training data. This may result in a large amount of wasted material, a large amount of chamber downtime, expended energy, etc. In some embodiments, a processing chamber control system may be performed or partially performed by a machine learning model. These processing chambers may be operated outside ideal conditions in generating training data (e.g., operated without the assistance of the associated controlling model). Utilizing the methods of generating training data and training of machine learning models presented in this disclosure may reduce material expenditure, time expenditure, energy expenditure, uncontrolled chamber usage, etc., in generating data for training (or retraining) a machine learning model.

Aspects of the present disclosure describe a method, including determining that conditions of a processing chamber have changed since a trained machine learning model associated with the processing chamber was trained. The trained machine learning model is configured to receive as input sensor data. The sensor data is associated with a process of the processing chamber. The trained machine learning model is configured to produce as output an indication of performance of the processing chamber. The method further includes determining whether a change in the conditions of the processing chamber is a gradual change or a sudden change. Responsive to determining that the change in the conditions of the processing chamber is a gradual change, the method further includes performing a first training process to generate a new trained machine learning model. Responsive to determining that the change in the conditions of the processing chamber is a sudden change, the method further includes performing a second training process to generate the new trained machine learning model. The second training process is different from the first training process.

In another aspect of the present disclosure, a system is enabled. The system includes memory and a processing device, coupled to the memory. The processing device is configured to determine that processing chamber conditions have changed since a trained machine learning model associated with the processing chamber was trained. The trained machine learning model is configured to receive as input sensor data. The sensor data is associated with a process of the processing chamber. The trained machine learning model is configured to produce as output an indication of performance of the processing chamber. The processing device is further configured to determine whether a change in the conditions of the processing chamber is a gradual change or a sudden change. Responsive to determining that the change in the conditions of the processing chamber is a gradual change, the processing device is further configured to perform a first training process to generate a new trained machine learning model. Responsive to determining that the change in the conditions of the processing chamber is a sudden change, the processing device is further configured to perform a second training process to generate the new trained machine learning model. The second training process is different from the first training process.

In another aspect of the present disclosure, a non-transitory machine-readable storage medium is enabled. The storage medium stores instruction which, when executed, cause a processing device to perform operations. The operations include determining that processing chamber conditions have changed since a trained machine learning model associated with the processing chamber was trained. The trained machine learning model is configured to receive as input sensor data. The sensor data is associated with a process of the processing chamber. The trained machine learning model is configured to produce as output an indication of performance of the processing chamber. The operations further include determining whether a change in the conditions of the processing chamber is a gradual change or a sudden change. Responsive to determining that the change in the conditions of the processing chamber is a gradual change, the operations include performing a first training process to generate a new trained machine learning model. Responsive to determining that the change in the conditions of the processing chamber is a sudden change, the operations further include performing a second training process to generate the new trained machine learning model. The second training process is different from the first training process.

FIG. 1 is a block diagram illustrating an exemplary system 100 (exemplary system architecture), according to some embodiments. The system 100 includes a client device 120, manufacturing equipment 124, sensors 126, metrology equipment 128, a predictive server 112, and a data store 140. The predictive server 112 may be part of a predictive system 110. The predictive system 110 may further include server machines 170 and 180.

Sensors 126 may provide sensor data 142 associated with manufacturing equipment 124 (e.g., associated with producing, by manufacturing equipment 124, corresponding products, such as substrates). Sensor data 142 may be used to ascertain equipment health and/or product health (e.g., product quality). Manufacturing equipment 124 may produce products following a recipe or performing runs over a period of time. In some embodiments, sensor data 142 may include values of one or more of optical sensor data, spectral data, temperature (e.g., heater temperature), spacing (SP), pressure, High Frequency Radio Frequency (HFRF), radio frequency (RF) match voltage, RF match current, RF match capacitor position, voltage of Electrostatic Chuck (ESC), actuator position, electrical current, flow, power, voltage, etc. Sensor data 142 may include historical sensor data 144 and current sensor data 146. Current sensor data 146 may be associated with a product currently being processed, a product recently processed, a number of recently processed products, etc. Historical sensor data 144 may include old sensor data 148 and new sensor data 149. "Old" and "new" designations, in this context, indicate data used for training a machine learning model (or data not used to train a machine learning model, but applicable to the model), e.g., old historical sensor data 148, and data generated after the machine learning model was trained (or after the manufacturing system has undergone a change that reduces the predictive power of the machine learning model, e.g., new historical sensor data 149. Sensor data 142 may be associated with or indicative of manufacturing parameters such as hardware parameters (e.g., hardware settings or installed components, e.g., size, type, etc.) of manufacturing equipment 124 or process parameters (e.g., heater settings, gas flow, etc.) of manufacturing equipment 124. Data associated with some hardware parameters and/or process parameters may, instead or additionally, be stored as manufacturing parameters 150, which may include historical manufacturing parameters (e.g., associated with historical processing runs) and current manufacturing parameters. Manufacturing parameters 150 may be indicative of input settings to the manufacturing device (e.g., heater power, gas flow, etc.). Sensor data 142 and/or manufacturing parameters 150 may be provided while the manufacturing equipment 124 is performing manufacturing processes (e.g., equipment readings while processing products). Sensor data 142 may be different for each product (e.g., each substrate). Substrates may have property values (film thickness, film strain, etc.) measured by metrology equipment 128. Metrology data 160 may be a component of data store 140.

In some embodiments, sensor data 142, metrology data 160, or manufacturing parameters 150 may be processed (e.g., by the client device 120 and/or by the predictive server 112). Processing of the sensor data 142 may include generating features. In some embodiments, the features are a pattern in the sensor data 142, metrology data 160, and/or manufacturing parameters 150 (e.g., slope, width, height, peak, etc.) or a combination of values from the sensor data 142, metrology data, and/or manufacturing parameters (e.g., power derived from voltage and current, etc.). Sensor data 142 may include features and the features may be used by the predictive component 114 for performing signal processing and/or for obtaining predictive data 168 for performance of a corrective action.

Each instance (e.g., set) of sensor data 142 may correspond to a product (e.g., a substrate), a set of manufacturing equipment, a type of substrate produced by manufacturing equipment, or the like. Each instance of metrology data 160 and manufacturing parameters 150 may likewise correspond to a product, a set of manufacturing equipment, a type of substrate produced by manufacturing equipment, or the like. The data store may further store information associating sets of different data types, e.g. information indicative that a set of sensor data, a set of metrology data, and a set of manufacturing parameters are all associated with the same product, manufacturing equipment, type of substrate, etc.

In some embodiments, a processing device may be used to generate synthetic sensor data 162. Synthetic sensor data may be processed in any of the ways described above in connection with sensor data 142, e.g., generating features, combining values, linking data from a particular recipe, chamber, or substrate, etc. Synthetic sensor data 162 may share features with sensor data 142, e.g., may have features in common with current sensor data 146, historical sensor data 144, etc.

In some embodiments, predictive system 110 may generate predictive data 168 using supervised machine learning (e.g., predictive data 168 includes output from a machine learning model that was trained using labeled data, such as sensor data labeled with metrology data, etc.). In some embodiments, predictive system 110 may generate predictive data 168 using unsupervised machine learning (e.g., predictive data 168 includes output from a machine learning model that was trained using unlabeled data, output may include clustering results, principle component analysis, anomaly detection, etc.). In some embodiments, predictive system 110 may generate predictive data 168 using semi-supervised learning (e.g., training data may include a mix of labeled and unlabeled data, etc.).

Client device 120, manufacturing equipment 124, sensors 126, metrology equipment 128, predictive server 112, data store 140, server machine 170, and server machine 180 may be coupled to each other via network 130 for generating predictive data 168 to perform corrective actions. In some embodiments, network 130 may provide access to cloud-based services. Operations performed by client device 120, predictive system 110, data store 140, etc., may be performed by virtual cloud-based devices.

In some embodiments, network 130 is a public network that provides client device 120 with access to the predictive server 112, data store 140, and other publicly available computing devices. In some embodiments, network 130 is a private network that provides client device 120 access to manufacturing equipment 124, sensors 126, metrology equipment 128, data store 140, and other privately available computing devices. Network 130 may include one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

Client device 120 may include computing devices such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. Client device 120 may include a corrective action component 122. Corrective action component 122 may receive user input (e.g., via a Graphical User Interface (GUI) displayed via the client device 120) of an indication associated with manufacturing equipment 124. In some embodiments, corrective action component 122 transmits the indication to the predictive system 110, receives output (e.g., predictive data 168) from the predictive system 110, determines a corrective action based on the output, and causes the corrective action to be implemented. In some embodiments, corrective action component 122 obtains sensor data 142 (e.g., current sensor data 146) associated with manufacturing equipment 124 (e.g., from data store 140, etc.) and provides sensor data 142 (e.g., current sensor data 146) associated with the manufacturing equipment 124 to predictive system 110. In some embodiments, corrective action component 122 stores sensor data 142 in data store 140 and predictive server 112 retrieves sensor data 142 from data store 140. In some embodiments, predictive server 112 may store output (e.g., predictive data 168) of the trained model(s) 190 in data store 140 and client device 120 may retrieve the output from data store 140. In some embodiments, corrective action component 122 receives an indication of a corrective action from the predictive system 110 and causes the corrective action to be implemented. Each client device 120 may include an operating system that allows users to one or more of generate, view, or edit data (e.g., indication associated with manufacturing equipment 124, corrective actions associated with manufacturing equipment 124, etc.).

In some embodiments, metrology data 160 corresponds to historical property data of products (e.g., produced using manufacturing parameters associated with historical sensor data 144 and historical manufacturing parameters of manufacturing parameters 150) and predictive data 168 is associated with predicted property data (e.g., of products to be produced or that have been produced in conditions recorded by current sensor data 146 and/or current manufacturing parameters). In some embodiments, predictive data 168 is predicted metrology data (e.g., virtual metrology data) of the products to be produced or that have been produced according to conditions recorded as current sensor data 146 and/or current manufacturing parameters. In some embodiments, the predictive data 168 is an indication of abnormalities (e.g., abnormal products, abnormal components, abnormal manufacturing equipment 124, abnormal energy usage, etc.) and one or more causes of the abnormalities. In some embodiments, predictive data 168 is an indication of change over time or drift in some component of manufacturing equipment 124, sensors 126, metrology equipment 128, and the like. In some embodiments, predictive data 168 is an indication of an end of life of a component of manufacturing equipment 124, sensors 126, metrology equipment 128, or the like.

Performing manufacturing processes that result in defective products can be costly in time, energy, products, components, manufacturing equipment 124, the cost of identifying the defects and discarding the defective product, etc. By inputting sensor data 142 (e.g., manufacturing parameters that are being used or are to be used to manufacture a product) into predictive system 110, receiving output of predictive data 168, and performing a corrective action based on the predictive data 168, system 100 can have the technical advantage of avoiding the cost of producing, identifying, and discarding defective products.

Performing manufacturing processes that result in failure of the components of the manufacturing equipment 124 can be costly in downtime, damage to products, damage to equipment, express ordering replacement components, etc. By inputting sensor data 142 (e.g., manufacturing parameters that are being used or are to be used to manufacture a product), receiving output of predictive data 168, and performing corrective action (e.g., predicted operational maintenance, such as replacement, processing, cleaning, etc. of components) based on the predictive data 168, system 100 can have the technical advantage of avoiding the cost of one or more of unexpected component failure, unscheduled downtime, productivity loss, unexpected equipment failure, product scrap, or the like. Monitoring the performance over time of components, e.g. manufacturing equipment 124, sensors 126, metrology equipment 128, and the like, may provide indications of degrading components.

Manufacturing parameters may be suboptimal for producing product which may have costly results of increased resource (e.g., energy, coolant, gases, etc.) consumption, increased amount of time to produce the products, increased component failure, increased amounts of defective products, etc. By inputting the sensor data 142 into the trained model 190, receiving an output of predictive data 168, and performing (e.g., based on the predictive data 168) a corrective action of updating manufacturing parameters (e.g., setting optimal manufacturing parameters), system 100 can have the technical advantage of using optimal manufacturing parameters (e.g., hardware parameters, process parameters, optimal design) to avoid costly results of suboptimal manufacturing parameters.

Corrective action may be associated with one or more of Computational Process Control (CPC), Statistical Process Control (SPC) (e.g., SPC on electronic components to determine process in control, SPC to predict useful lifespan of components, SPC to compare to a graph of 3-sigma, etc.), Advanced Process Control (APC), model-based process control, preventative operative maintenance, design optimization, updating of manufacturing parameters, updating manufacturing recipes, feedback control, machine learning modification, or the like.

In some embodiments, the corrective action includes providing an alert (e.g., an alarm to stop or not perform the manufacturing process if the predictive data 168 indicates a predicted abnormality, such as an abnormality of the product, a component, or manufacturing equipment 124). In some embodiments, a machine learning model is trained to monitor the progress of a processing run (e.g., monitor in-situ sensor data to predict if a manufacturing process has reached completion). In some embodiments, the machine learning model may send instructions to end a processing run when the model determines that the process is complete. In some embodiments, the corrective action includes providing feedback control (e.g., modifying a manufacturing parameter responsive to the predictive data 168 indicating a predicted abnormality). In some embodiments, performance of the corrective action includes causing updates to one or more manufacturing parameters. In some embodiments performance of a corrective action may include retraining a machine learning model associated with manufacturing equipment 124. In some embodiments, performance of a corrective action may include training a new machine learning model associated with manufacturing equipment 124.

Manufacturing parameters 150 may include hardware parameters (e.g., information indicative of which components are installed in manufacturing equipment 124, indicative of component replacements, indicative of component age, indicative of software version or updates, etc.) and/or process parameters (e.g., temperature, pressure, flow, rate, electrical current, voltage, gas flow, lift speed, etc.). In some embodiments, the corrective action includes causing preventative operative maintenance (e.g., replace, process, clean, etc. components of the manufacturing equipment 124). In some embodiments, the corrective action includes causing design optimization (e.g., updating manufacturing parameters, manufacturing processes, manufacturing equipment 124, etc. for an optimized product). In some embodiments, the corrective action includes a updating a recipe (e.g., altering the timing of manufacturing subsystems entering an idle or active mode, altering set points of various property values, etc.).

Predictive server 112, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc. Operations of predictive server 112, server machine 170, server machine 180, data store 140, etc., may be performed by a cloud computing service, cloud data storage service, etc.

Predictive server 112 may include a predictive component 114. In some embodiments, the predictive component 114 may receive current sensor data 146, and/or current manufacturing parameters (e.g., receive from the client device 120, retrieve from the data store 140) and generate output (e.g., predictive data 168) for performing corrective action associated with the manufacturing equipment 124 based on the current data. In some embodiments, predictive component 114 may use one or more trained machine learning models 190 to determine the output for performing the corrective action based on current data.

In some embodiments, manufacturing equipment 124 may have one or more machine learning models associated with it. Machine learning models associated with manufacturing equipment 124 may perform a variety of functions. Machine learning models may be configured to accept as input sensor data and produce as output predicted metrology data. Machine learning models may be configured to accept as input manufacturing data (e.g., manufacturing settings) and produce as output predicted processing conditions. Machine learning models may be configured to accept as input sensor data (e.g., spectral data of a wafer) and produce as output an estimate of process progress. Machine learning models may be configured to accept as input an indication of quality of an incoming piece to be processed, and produce as output processing instructions (e.g., to compensate for an incoming wafer anomaly). Machine learning models may be configured to accept as input metrology data and produce as output an indication of an anomaly or a root cause of an anomaly. Other machine learning models associated with manufacturing equipment 124 are possible and within the scope of this disclosure. The output of a machine learning model (e.g., machine learning model 190) may be stored as predictive data 168 in data store 140.

Manufacturing equipment 124 may be associated with one or more machine learning models, e.g., model 190. Machine learning models associated with manufacturing equipment 124 may perform many tasks, including process control, classification, performance predictions, etc. Model 190 may be trained using data associated with manufacturing equipment 124 or products processed by manufacturing equipment 124, e.g., sensor data 142 (e.g., collected by sensors 126), manufacturing parameters 150 (e.g., associated with process control of manufacturing equipment 124), metrology data 160 (e.g., generated by metrology equipment 128), etc. One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In some embodiments, predictive component 114 receives current sensor data 146 and/or current manufacturing parameters 154, performs signal processing to break down the current data into sets of current data, provides the sets of current data as input to a trained model 190, and obtains outputs indicative of predictive data 168 from the trained model 190. In some embodiments, predictive data is indicative of metrology data (e.g., prediction of substrate quality). In some embodiments, predictive data is indicative of component health. In some embodiments, predictive data is indicative of processing progress (e.g., utilized to end a processing operation).

In some embodiments, the various models discussed in connection with model 190 (e.g., supervised machine learning model, unsupervised machine learning model, etc.) may be combined in one model (e.g., an ensemble model), or may be separate models. Predictive component 114 may receive current sensor data 146 and current manufacturing parameters 154, provide the data to a trained model 190, and receive information indicative of how much several components in the manufacturing chamber have drifted from their previous performance. Data may be passed back and forth between several distinct models included in model 190 and predictive component 114. In some embodiments, some or all of these operations may instead be performed by a different device, e.g., client device 120, server machine 170, server machine 180, etc. It will be understood by one of ordinary skill in the art that variations in data flow, which components perform which processes, which models are provided with which data, and the like are within the scope of this disclosure.

Data store 140 may be a memory (e.g., random access memory), a drive (e.g., a hard drive, a flash drive), a database system, a cloud-accessible memory system, or another type of component or device capable of storing data. Data store 140 may include multiple storage components (e.g., multiple drives or multiple databases) that may span multiple computing devices (e.g., multiple server computers). The data store 140 may store sensor data 142, manufacturing parameters 150, metrology data 160, synthetic sensor data 162, and predictive data 168. Sensor data 142 may include historical sensor data 144 and current sensor data 146. Sensor data may include sensor data time traces over the duration of manufacturing processes, associations of data with physical sensors, pre-processed data, such as averages and composite data, and data indicative of sensor performance over time (i.e., many manufacturing processes). Manufacturing parameters 150 and metrology data 160 may contain similar features. Historical sensor data 144 and historical manufacturing parameters may be historical data (e.g., at least a portion of these data may be used for training model 190). Current sensor data 146 may be current data (e.g., at least a portion to be input into learning model 190, subsequent to the historical data) for which predictive data 168 is to be generated (e.g., for performing corrective actions). Synthetic sensor data 162 may include data including representative features of several different data, e.g., may include features of old sensor data 148 (e.g., sensor data generated before training model 190) and features of new sensor data 149 (e.g., sensor data generated after training model 190).

In some embodiments, predictive system 110 further includes server machine 170 and server machine 180. Server machine 170 includes a data set generator 172 that is capable of generating data sets (e.g., a set of data inputs and a set of target outputs) to train, validate, and/or test model(s) 190, including one or more machine learning models. Some operations of data set generator 172 are described in detail below with respect to FIGS. 2 and 4A. In some embodiments, data set generator 172 may partition the historical data (e.g., historical sensor data 144, historical manufacturing parameters, synthetic sensor data 162 stored in data store 140) into a training set (e.g., sixty percent of the historical data), a validating set (e.g., twenty percent of the historical data), and a testing set (e.g., twenty percent of the historical data). In some embodiments, predictive system 110 (e.g., via predictive component 114) generates multiple sets of features. For example a first set of features may correspond to a first set of types of sensor data (e.g., from a first set of sensors, first combination of values from first set of sensors, first patterns in the values from the first set of sensors) that correspond to each of the data sets (e.g., training set, validation set, and testing set) and a second set of features may correspond to a second set of types of sensor data (e.g., from a second set of sensors different from the first set of sensors, second combination of values different from the first combination, second patterns different from the first patterns) that correspond to each of the data sets.

In some embodiments, machine learning model 190 is provided historical data as training data. The type of data provided will vary depending on the intended use of the machine learning model. For example, a machine learning model may be trained by providing the model with historical sensor data 144 as training input and corresponding metrology data 160 as target output. In some embodiments, a large volume of data is used to train model 190, e.g., sensor and metrology data of hundreds of substrates may be used. In some embodiments, manufacturing equipment 124 may experience one or more changes during the equipment's service lifetime (e.g., time since initial installation of the equipment, time since a maintenance or seasoning event, etc.). In some embodiments, manufacturing equipment 124 (e.g., one or more conditions of manufacturing equipment 124, quality of manufacturing equipment 124, etc.) may experience a gradual change. A gradual change may be related to components aging (e.g., wear and tear), chamber drift (e.g., material deposition during processing, component corrosion during processing, etc.), etc. In some embodiments, manufacturing equipment 124 may experience a sudden change. A sudden change may be related to performance of a maintenance process, performance of a seasoning process, replacement of one or more components of manufacturing equipment 124, etc. A gradual change or a sudden change may impact performance of manufacturing equipment 124, e.g., may impact relationships between control methods (e.g., set points) and conditions in the chamber. A change in manufacturing equipment 124 may impact the performance of one or more machine learning models associated with manufacturing equipment 124. Relationships between machine learning inputs and outputs may be altered by changes in manufacturing equipment.

Server machine 180 includes a training engine 182, a validation engine 184, selection engine 185, and/or a testing engine 186. An engine (e.g., training engine 182, a validation engine 184, selection engine 185, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 may be capable of training a model 190 using one or more sets of features associated with the training set from data set generator 172. The training engine 182 may generate multiple trained models 190, where each trained model 190 corresponds to a distinct set of features of the training set (e.g., sensor data from a distinct set of sensors). For example, a first trained model may have been trained using all features (e.g., X1-X5), a second trained model may have been trained using a first subset of the features (e.g., X1, X2, X4), and a third trained model may have been trained using a second subset of the features (e.g., X1, X3, X4, and X5) that may partially overlap the first subset of features. Data set generator 172 may receive the output of a trained model (e.g., a physics-based digital twin model), collect that data into training, validation, and testing data sets, and use the data sets to train a second model (e.g., a machine learning model configured to output predictive data, corrective actions, etc.).

The validation engine 184 may be capable of validating a trained model 190 using a corresponding set of features of the validation set from data set generator 172. For example, a first trained machine learning model 190 that was trained using a first set of features of the training set may be validated using the first set of features of the validation set. The validation engine 184 may determine an accuracy of each of the trained models 190 based on the corresponding sets of features of the validation set. Validation engine 184 may discard trained models 190 that have an accuracy that does not meet a threshold accuracy. In some embodiments, selection engine 185 may be capable of selecting one or more trained models 190 that have an accuracy that meets a threshold accuracy. In some embodiments, selection engine 185 may be capable of selecting the trained model 190 that has the highest accuracy of the trained models 190.

Testing engine 186 may be capable of testing a trained model 190 using a corresponding set of features of a testing set from data set generator 172. For example, a first trained machine learning model 190 that was trained using a first set of features of the training set may be tested using the first set of features of the testing set. Testing engine 186 may determine a trained model 190 that has the highest accuracy of all of the trained models based on the testing sets.

In the case of a machine learning model, model 190 may refer to the model artifact that is created by training engine 182 using a training set that includes data inputs and corresponding target outputs (correct answers for respective training inputs). Patterns in the data sets can be found that map the data input to the target output (the correct answer), and machine learning model 190 is provided mappings that capture these patterns. The machine learning model 190 may use one or more of Support Vector Machine (SVM), Radial Basis Function (RBF), clustering, supervised machine learning, semi-supervised machine learning, unsupervised machine learning, k-Nearest Neighbor algorithm (k-NN), linear regression, random forest, neural network (e.g., artificial neural network), etc.

In some embodiments, one or more machine learning models 190 may be trained using historical data (e.g., historical sensor data 144). Models 190 may have been trained before a change occurs in manufacturing equipment 124, e.g., trained with old sensor data 148. After a change occurs in manufacturing equipment 124 (e.g., a gradual change or a sudden change), model 190 may no longer achieve acceptable performance (e.g., may no longer provide accurate predictions). Machine learning models 190 configured to perform a variety of functions may experience decreased performance following a change in manufacturing equipment 124. In some embodiments, after a change in manufacturing equipment 124, one or more new machine learning models 190 may be generated (e.g., by retraining an old model, by generating and training a model, etc.) to account for the change. The new machine learning models may be trained using new data, data generated after the change in manufacturing equipment 124, e.g., new sensor data 149. In some embodiments, a model 190 is to be trained with a large volume of data, e.g., data associated with hundreds of substrates. In some embodiments, a combination of data associated with processes performed before the change in manufacturing equipment 124 and processes performed after the change in manufacturing equipment 124 may be utilized for training. In some embodiments, a combination of old sensor data 148 and new sensor data 149 may be utilized for training. Machine learning models may be trained using similar features of other data types—sensor data 142 is described in more detail as a representative example. In some embodiments, manufacturing parameters 150 may include old historical data and new historical data, and current manufacturing parameter data. Metrology data may include similar categories of data. In some embodiments, a large amount of old sensor data 148 (e.g., data utilized to train an old machine learning model, data generated before a change occurred in manufacturing equipment 124 that wasn't used to train the model, etc.) may be used with a smaller amount of new sensor data 149 to train a new machine learning model. In some embodiments, the new sensor data 149 (and new manufacturing parameter data, new metrology data, or any other types to be used in training the machine learning model) is given greater weight in training (e.g., has a greater impact on relationships between learning layers in the machine learning model). In some embodiments, a processing device (e.g., associated with data set generator 172) may generate synthetic data 162. Synthetic data 162 may be utilized in training a machine learning model 190. In some embodiments, synthetic data captures features of both old data (e.g., old sensor data 148) and new data (e.g., new sensor data 149). In some embodiments, a set of synthetic data (e.g., a time trace, metrology of a substrate, etc.) may be calculated as $$D_S = D_O + R \times (D_N - D_U),$$

where $D_S$ is the synthetic data, $D_O$ is old data, $D_N$ is new data, and R is a random (e.g., pseudorandom) number between 0 and 1. In this way, synthetic data (e.g., synthetic sensor data 162) bridges a gap between old data and new data. In some embodiments, many sets of synthetic data may be generated to train a machine learning model. In some embodiments, manufacturing equipment 124 which has undergone a gradual change may be trained using a combination of old data and new data. In some embodiments, manufacturing equipment 124 which has undergone a sudden change may be trained using synthetic data.

Using partially old data to train a model 190 to be associated with manufacturing equipment 124 that has undergone a change has significant technical advantages over other methods. In some embodiments, a large amount of data (e.g., hundreds of substrates) may be used to train a machine learning model. It may be expensive to generate such a volume of data, e.g., in raw materials expended, process gasses, energy, time, equipment wear, etc. New data (e.g., new sensor data 149, data generated from processing runs performed after a change in manufacturing equipment 124) may capture the change in manufacturing equipment 124, e.g., may allow a machine learning model to express relationships between conditions of the changed chamber. Training with a combination of old and new data (e.g., some of each type of data, synthetic data combining both types, etc.) may be performed with a smaller volume of new data than training without utilizing old data. This approach may be less expensive and/or more efficient than training with new data alone.

In some embodiments, a number of machine learning models 190 may be associated with manufacturing equipment 124. In some embodiments, some or all of the machine learning models may be retrained together, e.g., a maintenance or seasoning event may cause the performance of all associated machine learning models 190 to drop below a threshold of acceptable performance. In some embodiments, one or some of the machine learning models 190 associated with manufacturing equipment 124 may be affected by a change in manufacturing equipment 124. For example, a replaced component may affect machine learning models associated with the subsystem of the component, but not other machine learning models (e.g., associated with other subsystems). In some embodiments, machine learning models may be affected by gradual change in manufacturing equipment 124 at different rates. Designations of before a change and after a change, e.g., designations of old historical data and new historical data, may vary from model to model.

Predictive component 114 may provide current data to model 190 and may run model 190 on the input to obtain one or more outputs. For example, predictive component 114 may provide current sensor data 146 to model 190 and may run model 190 on the input to obtain one or more outputs. Predictive component 114 may be capable of determining (e.g., extracting) predictive data 168 from the output of model 190. Predictive component 114 may determine (e.g., extract) confidence data from the output that indicates a level of confidence that predictive data 168 is an accurate predictor of a process associated with the input data for products produced or to be produced using the manufacturing equipment 124 at the current sensor data 146 and/or current manufacturing parameters. Predictive component 114 or corrective action component 122 may use the confidence data to decide whether to cause a corrective action associated with the manufacturing equipment 124 based on predictive data 168.

The confidence data may include or indicate a level of confidence that the predictive data 168 is an accurate prediction for products or components associated with at least a portion of the input data. In one example, the level of confidence is a real number between 0 and 1 inclusive, where 0 indicates no confidence that the predictive data 168 is an accurate prediction for products processed according to input data or component health of components of manufacturing equipment 124 and 1 indicates absolute confidence that the predictive data 168 accurately predicts properties of products processed according to input data or component health of components of manufacturing equipment 124. Responsive to the confidence data indicating a level of confidence below a threshold level for a predetermined number of instances (e.g., percentage of instances, frequency of instances, total number of instances, etc.) predictive component 114 may cause trained model 190 to be re-trained (e.g., based on current sensor data 146, current manufacturing parameters 154, etc.). In some embodiments, retraining may include generating one or more data sets (e.g., via data set generator 172) utilizing old historical data and new historical data. In some embodiments, retraining may include generating a new model 190 from the old model 190. In some embodiments, retraining may include generating a new model 190 without starting at the old model 190.

For purpose of illustration, rather than limitation, aspects of the disclosure describe the training of one or more machine learning models 190 using historical data (e.g., historical sensor data 144, historical manufacturing parameters) and inputting current data (e.g., current sensor data 146, current manufacturing parameters, and current metrology data) into the one or more trained machine learning models to determine predictive data 168. In other embodiments, a heuristic model, physics-based model, or rule-based model is used to determine predictive data 168 (e.g., without using a trained machine learning model). In some embodiments, such models may be trained using historical data. In some embodiments, these models may be retrained utilizing a combination of new and old historical data. Predictive component 114 may monitor historical sensor data 144, historical manufacturing parameters, and metrology data 160. Any of the information described with respect to data inputs 210 of FIG. 2 may be monitored or otherwise used in the heuristic, physics-based, or rule-based model.

In some embodiments, the functions of client device 120, predictive server 112, server machine 170, and server machine 180 may be provided by a fewer number of machines. For example, in some embodiments server machines 170 and 180 may be integrated into a single machine, while in some other embodiments, server machine 170, server machine 180, and predictive server 112 may be integrated into a single machine. In some embodiments, client device 120 and predictive server 112 may be integrated into a single machine. In some embodiments, functions of client device 120, predictive server 112, server machine 170, server machine 180, and data store 140 may be performed by a cloud-based service.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 may determine the corrective action based on the predictive data 168. In another example, client device 120 may determine the predictive data 168 based on output from the trained machine learning model.

In addition, the functions of a particular component can be performed by different or multiple components operating together. One or more of the predictive server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Embodiments of the disclosure may be applied to data quality evaluation, feature enhancement, model evaluation, Virtual Metrology (VM), Predictive Maintenance (PdM), limit optimization, process control, or the like.

Figure 2:
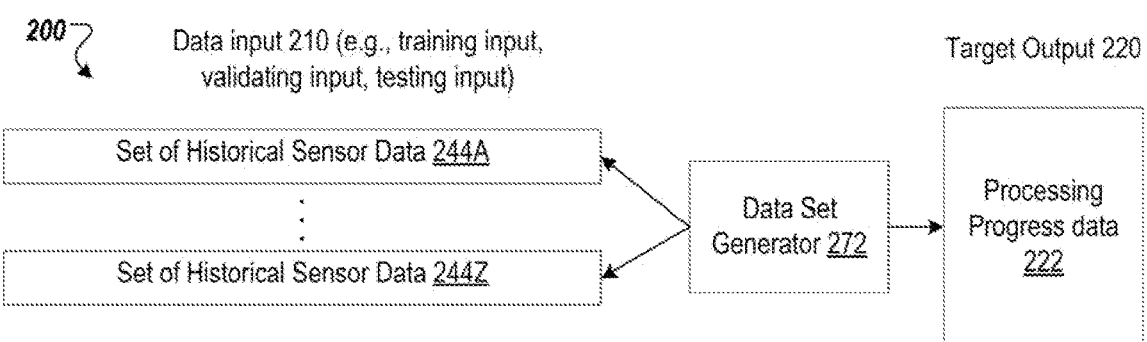
FIG. 2 depicts a block diagram of an example data set generator to create data sets for models, according to some embodiments.

FIG. 2 depicts a block diagram of an example data set generator 272 (e.g., data set generator 172 of FIG. 1) to create data sets for training, testing, validating, etc. a model (e.g., model 190 of FIG. 1), according to some embodiments. Each data set generator 272 may be part of server machine 170 of FIG. 1. In some embodiments, several machine learning models associated with manufacturing equipment 124 may be trained, used, and maintained (e.g., within a manufacturing facility). Each machine learning model may be associated with one data set generators 272, multiple machine learning models may share a data set generator 272, etc.

System 200 containing data set generator 272 (e.g., data set generator 172 of FIG. 1) creates data sets for one or more machine learning models (e.g., model 190 of FIG. 1). Data set generator 272 may create data sets (e.g., data input 210) using historical data. Example data set generator 272 is configured to generate data sets for a machine learning model configured to take as input sensor data and produce as output data to be used for process control. Analogous data set generators (or analogous operations of data set generator 272) may be utilized for machine learning models configured to perform different functions, e.g., a machine learning model configured to receive as input sensor data and produce as output predicted metrology data of a product, a machine learning model configured to receive as input metrology data and produce as output predicted system faults, etc.

Data set generator 272 may generate data sets to train, test, and validate a machine learning model. The machine learning model is provided with set of historical sensor data 244A (e.g., historical reflectance spectral data of a substrate) as data input 210. The machine learning model may be provided with processing progress data 222 (e.g., data indicative of a relationship between spectral data and etch progress) as target output 220. The machine learning model may be trained to predict, based on in-situ spectral data of a substrate, whether a processing operation has been completed. In some embodiments, data set generator 272 produces a number of data sets, e.g., set of historical sensor data 244A through set of historical sensor data 244Z. In some embodiments, one or more of these sets of data input 210 may be associated with target output 220.

In some embodiments, a new machine learning model is to be generated, e.g., to perform the same function as a previous machine learning model. In some embodiments, there may not be an old machine learning model, but insufficient data to train a machine learning model has been collected subsequent to a change in a manufacturing system. Data set generator 272 may generate data sets utilizing both old and new historical data, e.g., data generated before and after a change in a manufacturing system. In some embodiments, a data set may include old and new data sets, e.g., old and new trace sensor data. In some embodiments, a data set may include synthetic data generated to include features of old and new historical data. In some embodiments, data set generator 272 may generate data input 210 but not generate target output 220 corresponding to one or more data inputs, e.g., to train an unsupervised or semi-supervised machine learning model.

In some embodiments, data set generator 272 generates a data set (e.g., training set, validating set, testing set) that includes one or more data inputs 210 (e.g., training input, validating input, testing input) and may include one or more target outputs 220 that correspond to the data inputs 210. The data set may also include mapping data that maps the data inputs 210 to the target outputs 220. Data inputs 210 may also be referred to as "features," "attributes," or "information." In some embodiments, data set generator 272 may provide the data set to the training engine 182, validating engine 184, or testing engine 186, where the data set is used to train, validate, or test the model 190 (e.g., one of the machine learning models that are included in model 190, ensemble model 190, etc.). Some embodiments of generating a training set are further described with respect to FIG. 4A.

In some embodiments, data set generator 272 generates data input 210 and does not generate target output 220 (e.g., data set generator 272A generating sets of historical metrology data 262A-262Z as data input 210A), to supply to an unsupervised machine learning model. In some embodiments, data set generator 272 generates the data input 210 and target output 220 (e.g., to train a supervised or semi-supervised model). In some embodiments, data inputs 210 may include one or more sets of data. As an example, system 200 may produce sets of sensor data that may include one or more of sensor data from one or more types of sensors, combination of sensor data from one or more types of sensors, patterns from sensor data from one or more types of sensors, manufacturing parameters from one or more manufacturing parameters, combinations of some manufacturing parameter data and some sensor data, etc.

In some embodiments, data set generator 272 may generate a first data input corresponding to a first set of historical sensor data 244A to train, validate, or test a first machine learning model and the data set generator 272 may generate a second data input corresponding to a second set of historical sensor data 244B to train, validate, or test a second machine learning model.

Data inputs 210 and target outputs 220 to train, validate, or test a machine learning model may include information for a particular manufacturing chamber (e.g., for particular substrate manufacturing equipment). For example, historical sensor data 244 and processing progress data 222 may be associated with the same manufacturing chamber.

In some embodiments, the information used to train the machine learning model may be from specific types of manufacturing equipment (e.g., manufacturing equipment 124 of FIG. 1) of the manufacturing facility having specific characteristics. Training a machine learning model based on a type of equipment may allow the trained model(s) to determine outcomes for a specific group of manufacturing equipment 124 based on input for current sensor data (e.g., current sensor data 146) associated with one or more components sharing characteristics of the specific group. In some embodiments, the information used to train the model may be for components from two or more manufacturing facilities and may allow the trained machine learning model to determine outcomes for components based on input from one manufacturing facility.

In some embodiments, subsequent to generating a data set and training, validating, or testing a machine learning model 190 using the data set, model 190 may be further trained, validated, or tested, or adjusted (e.g., adjusting weights or parameters associated with input data of model 190, such as connection weights in a neural network).

Figure 3:
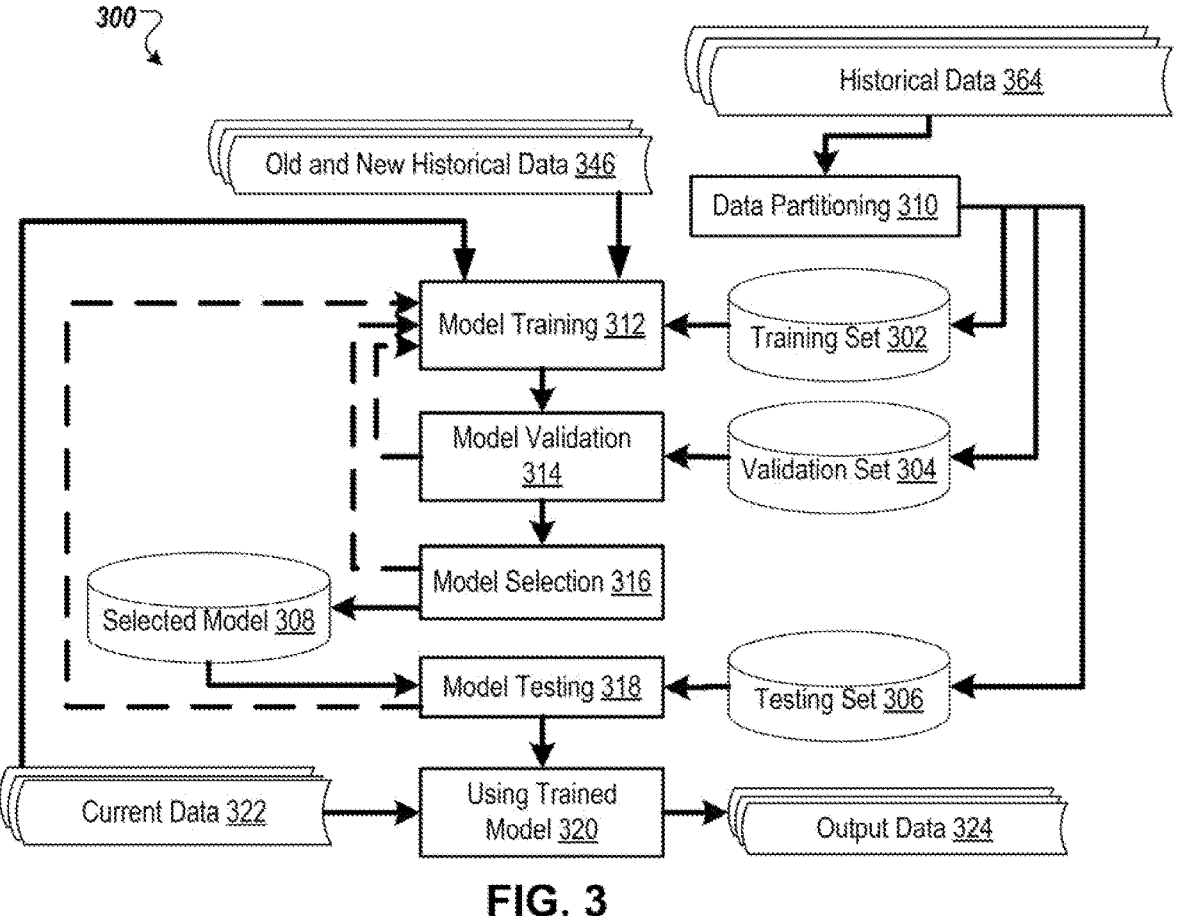
FIG. 3 is a block diagram illustrating a system for generating output data, according to some embodiments.

FIG. 3 is a block diagram illustrating system 300 for generating output data (e.g., predictive data 168 of FIG. 1), according to some embodiments. In some embodiments, system 300 may be used in conjunction with a machine learning model to determine a corrective action associated with manufacturing equipment. In some embodiments, system 300 may be used in conjunction with a machine learning model to determine a fault of manufacturing equipment. In some embodiments, system 300 may be used in conjunction with a machine learning model to cluster or classify substrates. System 300 may be used in conjunction with a machine learning model with a different function than those listed, associated with a manufacturing system.

At block 310, system 300 (e.g., components of predictive system 110 of FIG. 1) performs data partitioning (e.g., via data set generator 172 of server machine 170 of FIG. 1) of the historical data 364 (e.g, historical sensor data 144 and historical metrology data for model 190 of FIG. 1 configured to perform process control operations, historical metrology data and historical fault labels for model 190 configured to detect problems with the manufacturing system, etc.) to generate training set 302, validation set 304, and testing set 306. For example, the training set may be 60% of the historical data, the validation set may be 20% of the historical data, and the testing set may be 20% of the historical data.

The generation of training set 302, validation set 304, and testing set 306 can be tailored for a particular application.

For example, the training set may be 60% of the historical data, the validation set may be 20% of the historical data, and the testing set may be 20% of the historical data. System 300 may generate a plurality of sets of features for each of the training set, the validation set, and the testing set. For example, if historical data 364 includes features derived from sensor data from 20 sensors (e.g., sensors 126 of FIG. 1) and 10 manufacturing parameters (e.g., manufacturing parameters that correspond to the sensor data from the 20 sensors), the sensor data may be divided into a first set of features including sensors 1-10 and a second set of features including sensors 11-20. The manufacturing parameters may also be divided into sets, for instance a first set of manufacturing parameters including parameters 1-5, and a second set of manufacturing parameters including parameters 6-10. Either target input, target output, both, or neither may be divided into sets. Multiple models may be trained on different sets of data.

At block 312, system 300 performs model training (e.g., via training engine 182 of FIG. 1) using training set 302. Training of a machine learning model and/or of a physics-based model (e.g., a digital twin) may be achieved in a supervised learning manner, which involves providing a training dataset including labeled inputs through the model, observing its outputs, defining an error (by measuring the difference between the outputs and the label values), and using techniques such as deep gradient descent and back-propagation to tune the weights of the model such that the error is minimized. In many applications, repeating this process across the many labeled inputs in the training dataset yields a model that can produce correct output when presented with inputs that are different than the ones present in the training dataset.

For each training data item in the training dataset, the training data item may be input into the model (e.g., into the machine learning model). The model may then process the input training data item (e.g., a process recipe from a historical processing run) to generate an output. The output may include, for example, simulated sensor readings. The output may be compared to a label of the training data item (e.g., actual sensor readings that were measured).

Processing logic may then compare the generated output (e.g., simulated sensor readings) to the label (e.g., actual sensor readings) that was included in the training data item. Processing logic determines an error (i.e., a classification error) based on the differences between the output and the label(s). Processing logic adjusts one or more weights and/or values of the model based on the error.

In the case of training a neural network, an error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

System 300 may train multiple models using multiple sets of features of the training set 302 (e.g., a first set of features of the training set 302, a second set of features of the training set 302, etc.). For example, system 300 may train a model to generate a first trained model using the first set of features in the training set (e.g., sensor data from sensors 1-10) and to generate a second trained model using the second set of features in the training set (e.g., sensor data from sensors 11-20). In some embodiments, the first trained model and the second trained model may be combined to generate a third trained model (e.g., which may be a better predictor than the first or the second trained model on its own). In some embodiments, sets of features used in comparing models may overlap (e.g., first set of features being sensor data from sensors 1-15 and second set of features being sensors 5-20). In some embodiments, hundreds of models may be generated including models with various permutations of features and combinations of models.

At block 314, system 300 performs model validation (e.g., via validation engine 184 of FIG. 1) using the validation set 304. The system 300 may validate each of the trained models using a corresponding set of features of the validation set 304. For example, system 300 may validate the first trained model using the first set of features in the validation set (e.g., sensor data from sensors 1-10) and the second trained model using the second set of features in the validation set (e.g., sensor data from sensors 11-20). In some embodiments, system 300 may validate hundreds of models (e.g., models with various permutations of features, combinations of models, etc.) generated at block 312. At block 314, system 300 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. System 300 may discard the trained models that have an accuracy that is below the threshold accuracy (e.g., based on the validation set).

At block 316, system 300 performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow may return to block 312 where the system 300 performs model training using further refined training sets corresponding to further refined sets of features for determining a trained model that has the highest accuracy.

At block 318, system 300 performs model testing (e.g., via testing engine 186 of FIG. 1) using testing set 306 to test selected model 308. System 300 may test, using the first set of features in the testing set (e.g., sensor data from sensors 1-10), the first trained model to determine the first trained model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where system 300 performs model training (e.g., retraining) using different training sets corresponding to different sets of features (e.g., sensor data from different sensors). Responsive to determining that selected model 308 has an accuracy that meets a threshold accuracy based on testing set 306, flow continues to block 320. In at least block 312, the model may learn patterns in the historical data to make predictions and in block 318, the system 300 may apply the model on the remaining data (e.g., testing set 306) to test the predictions.

At block 320, system 300 uses the trained model (e.g., selected model 308) to receive current data 322 (e.g., current sensor data 146 of FIG. 1) and determines (e.g., extracts), from the output of the trained model, output data 324 (e.g., predictive data 168 of FIG. 1). A corrective action associated with the manufacturing equipment 124 of FIG. 1 may be performed in view of output data 324. In some embodiments, current data 322 may correspond to the same types of features in the historical data used to train the machine learning model. In some embodiments, current data 322 corresponds to a same type of features as a subset of the types of features in historical data that are used to train selected model 308.

In some embodiments, the performance of a machine learning model trained, validated, and tested by system 300 may deteriorate. For example, a manufacturing system associated with the trained machine learning model may undergo a gradual change or a sudden change. A change in the manufacturing system may result in decreased performance of the trained machine learning model. A new model may be generated to replace the machine learning model with decreased performance. The new model may be generated by altering the old model by retraining, by generating a new model, etc. In some embodiments, a combination of several types of data may be utilized for retraining. In some embodiments, a combination of current data 322 and old and new historical data 346 may be utilized for training. In some embodiments, old and new historical data 346 may include data associated with processing runs before and after the change occurred in the manufacturing system. In some embodiments, old and new historical data 346 may include data sets that include features of both old and new historical data, e.g., synthetic sensor data 162 of FIG. 1.

In some embodiments, one or more of the acts 310-320 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed.

FIG. 3 depicts a system configured for training, validating, testing, and using one or more machine learning models. The machine learning models are configured to accept data as input (e.g., set points provided to manufacturing equipment, sensor data, metrology data, etc.) and provide data as output (e.g., predictive data, corrective action data, classification data, etc.). In some embodiments, a model may receive manufacturing parameters and sensor data, and be configured to output a list of components predicted to contribute to faults in the manufacturing system. Partitioning, training, validating, selection, testing, and using blocks of system 300 may be executed similarly to train a second model, utilizing different types of data. Retraining may also be done, utilizing current data 322 and/or old and new historical data 346.

FIGS. 4A-D are flow diagrams of methods 400A-D associated with training and retraining machine learning models, according to certain embodiments. Methods 400A-D may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 400A-D may be performed, in part, by predictive system 110. Method 400A may be performed, in part, by predictive system 110 (e.g., server machine 170 and data set generator 172 of FIG. 1, data set generator 272 of FIG. 2A-B). Predictive system 110 may use method 400A to generate a data set to at least one of train, validate, or test a machine learning model, in accordance with embodiments of the disclosure. Methods 400B-D may be performed by predictive server 112 (e.g., predictive component 114) and/ or server machine 180 (e.g., training, validating, and testing operations may be performed by server machine 180). In some embodiments, a non-transitory storage medium stores instructions that when executed by a processing device (e.g., of predictive system 110, of server machine 180, of predictive server 112, etc.) cause the processing device to perform one or more of methods 400A-D.

For simplicity of explanation, methods 400A-D are depicted and described as a series of operations. However, operations in accordance with this disclosure can occur in various orders and/or concurrently and with other operations not presented and described herein. Furthermore, not all illustrated operations may be performed to implement methods 400A-D in accordance with the disclosed subject matter. In addition, those skilled in the art will understand and appreciate that methods 400A-D could alternatively be represented as a series of interrelated states via a state diagram or events.

Figures 4A, 4B:
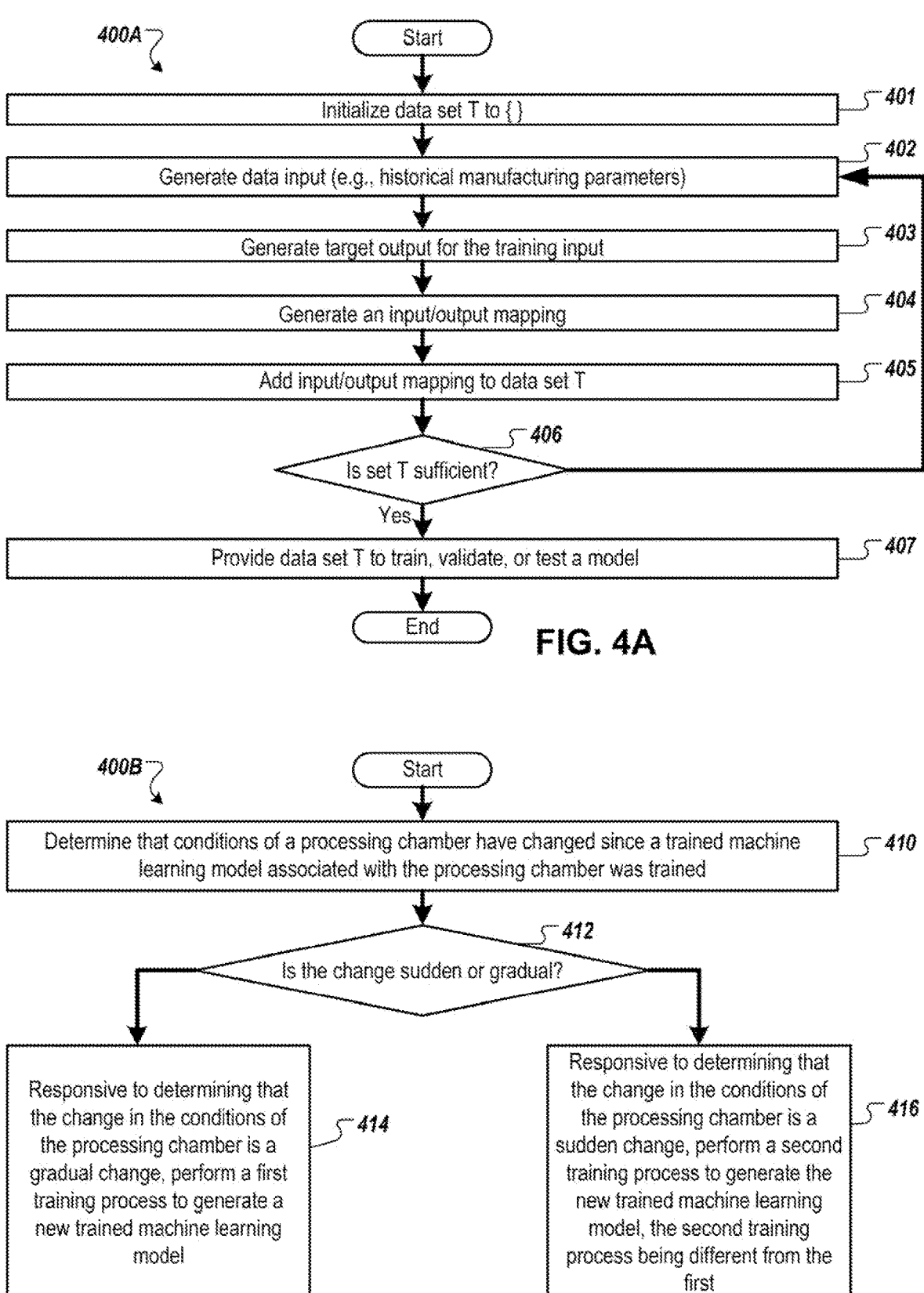
FIGS. 4A-D are flow diagrams of methods associated with generating one or more machine learning models for generating predictive data, according to some embodiments.

FIG. 4A is a flow diagram of a method 400A for generating a data set for a machine learning model, according to some embodiments.

Referring to FIG. 4A, in some embodiments, at block 401 the processing logic implementing method 400A initializes a training set T to an empty set.

At block 402, processing logic generates first data input (e.g., first training input, first validating input) that may include one or more of sensor data, manufacturing parameters, metrology data, etc. In some embodiments, the first data input may include a first set of features for types of data and a second data input may include a second set of features for types of data (e.g., as described with respect to FIG. 3).

In some embodiments, at block 403, processing logic generates a first target output for one or more of the data inputs (e.g., first data input). In some embodiments, the first target output is predictive data. In some embodiments, input data may be in the form of sensor data and target output may be a list of components likely to be faulty, as in the case of a machine learning model configured to identify failing manufacturing systems. In some embodiments, no target output is generated (e.g., an unsupervised machine learning model capable of grouping or finding correlations in input data, rather than requiring target output to be provided).

At block 404, processing logic optionally generates mapping data that is indicative of an input/output mapping. The input/output mapping (or mapping data) may refer to the data input (e.g., one or more of the data inputs described herein), the target output for the data input, and an association between the data input(s) and the target output. In some embodiments, such as in association with machine learning models where no target output is provided, block 404 may not be executed.

At block 405, processing logic adds the mapping data generated at block 404 to data set T, in some embodiments.

At block 406, processing logic branches based on whether data set T is sufficient for at least one of training, validating, and/or testing model 190. If so, execution proceeds to block 407, otherwise, execution continues back at block 402. It should be noted that in some embodiments, the sufficiency of data set T may be determined based simply on the number of inputs, mapped in some embodiments to outputs, in the data set, while in some other embodiments, the sufficiency of data set T may be determined based on one or more other criteria (e.g., a measure of diversity of the data examples, accuracy, etc.) in addition to, or instead of, the number of inputs.

At block 407, processing logic provides data set T (e.g., to server machine 180) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 210) are input to the neural network, and output values (e.g., numerical values associated with target outputs 220) of the input/ output mapping are stored in the output nodes of the neural network. The connection weights in the neural network are then adjusted in accordance with a learning algorithm (e.g., back propagation, etc.), and the procedure is repeated for the other input/output mappings in data set T. After block 407, a model (e.g., model 190) can be at least one of trained using training engine 182 of server machine 180, validated using validating engine 184 of server machine 180, or tested using testing engine 186 of server machine 180. The trained model may be implemented by predictive component 114 (of predictive server 112) to generate predictive data 168 for performing signal processing or for performing corrective action associated with manufacturing equipment 124.

FIG. 4B is a method 400B for generating a new trained machine learning model after a processing chamber experiences a change, according to some embodiments. At block 410 of method 400B, processing logic determines that conditions of a processing chamber have changed since a machine learning model associated with the processing chamber was trained. The machine learning model may be configured to receive as input sensor data associated with a process of the processing chamber and produce as output an indication of performance of the processing chamber. The indication of performance may include predicted metrology of a product, predicted process operation progress, etc. The sensor data may include in-situ spectral data of a substrate.

In some embodiments, chamber conditions may be monitored over time. In some embodiments, predicted metrology data may be compared to measured metrology data, e.g., occasional metrology measurements of products. If predicted metrology drops below a threshold accuracy (e.g., for a number of processing runs, a number of processing runs in a row, etc.), a determination may be made that conditions of a processing chamber have changed. In some embodiments, a relationship between set points and measured conditions may be monitored. The relationship may drift beyond a threshold value (e.g., achieving a measured property value may be accomplished by adjusting a set point 10% compared to a value that had achieved the same property value earlier in the service lifetime of a tool). In some embodiments, user input may be used to determine that a change in conditions has occurred, e.g., if a maintenance operation associated with the manufacturing equipment is performed.

At block 412, processing logic determines whether a change in the conditions of the processing chamber is a gradual change or a sudden change. A gradual change may include chamber drift, component aging, input material drift (e.g., due to drift of processing equipment used to process input materials), etc. A sudden change may be caused by replacement of one or more components of the processing chamber, performance of preventative or corrective maintenance on the processing chamber, a change in a process recipe enacted in the processing chamber, a change in a design of products produced using the processing chamber, a change in input materials to be processed in the processing chamber, etc.

In some embodiments, determination of whether a change in the conditions of the processing chamber is a gradual change or a sudden change may include determining a pattern of performance of a machine learning model. Performance of one or more machine learning models may be monitored. Predictive performance of a machine learning model may be compared to measured data. For example, predicted metrology data may be compared to measured metrology data. Performance over time may be indicative of a gradual change or a sudden change. For example, error in predictions output by a machine learning model may be monitored over time. Error over time may be used to determine a change is gradual, e.g., based on a slope of a best fit curve. Error over time may be used to determine a change is sudden, e.g., if a step function describes the error over time data well (e.g., step function residual error is less than a threshold). User input may be used to determine a sudden change, e.g., replacement of a component, performance of preventative maintenance, etc.

At block 414, responsive to determining that the change in the conditions of the processing chamber is a gradual change, processing logic performs a first training process to generate a new trained machine learning model. The first training process may include retraining the trained machine learning model. The first training process may include generating an entirely new model, e.g., not modifying the trained machine learning model. New machine learning model generation associated with a gradual change in the processing chamber is discussed in more detail in connection with FIG. 4C.

At block 416, responsive to determining that the change in the conditions of the processing chamber is a sudden change, processing logic performs a second training process to generate the new trained machine learning model. The second training process is different from the first training process. The second training process may have some features in common with the first training process, e.g., may include retraining the trained machine learning model. New machine learning model generation associated with a sudden change in the processing chamber is discussed in more detail in connection with FIG. 4D.

In some embodiments, the new machine learning model is used in performance of a corrective action. A processing device may receive current data, e.g., current sensor data. The processing device may provide the current data to the new trained machine learning model. The machine learning model may produce as output data indicative of a corrective action. The corrective action may include one or more of scheduling maintenance, updating a process recipe, providing process control to the processing chamber, or sending an alert to a user.

Figure 4C:
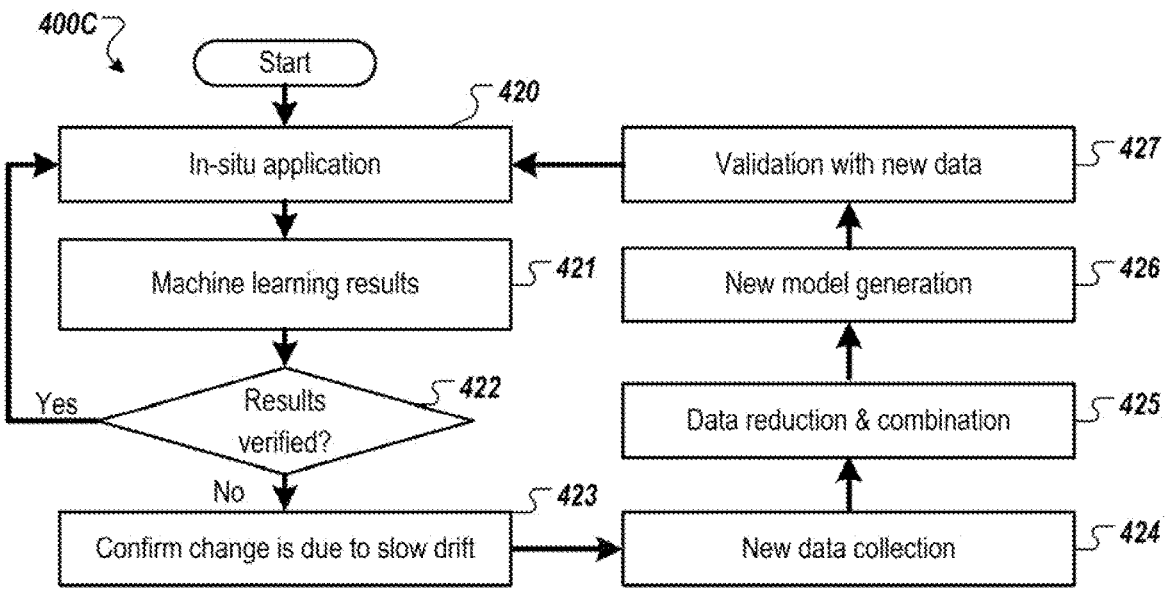

FIG. 4C is a flow diagram of a method 400C for generating a new machine learning model responsive to a gradual change to the processing chamber, according to some embodiments. Method 400C begins at block 420 with a trained machine learning model applied in-situ, e.g., in use associated with an active processing chamber. The trained machine learning model is provided input, and generates output.

At block 421, output from the machine learning model is generated. The machine learning model output may be any data type that may be output by a machine learning model associated with a processing device, e.g., predictive metrology, predictive fault detection, process control, etc. At block 422, output from the machine learning model is subject to a verification process. In some embodiments, the machine learning model output is verified for accuracy. If output of the machine learning model is verified to be accurate (e.g., accurate within a threshold), flow returns to block 420 and the trained machine learning model is used again. If output of the machine learning model is not verified to be accurate (e.g., predictions are not accurate within a threshold), flow continues to block 423.

At block 423, it is confirmed that the change in processing equipment is due to slow drift. In some embodiments, model performance over the service lifetime (e.g., time since installation of processing equipment, time since a last maintenance or seasoning event, etc.) is monitored. Analysis of the output (and verification results) of the machine learning model may indicate gradually decreasing performance. In some embodiments, processing logic may be provided with data indicating a gradual change, e.g., if it is found that an upstream process has experienced appreciable drift.

At block 424, new data is collected that reflects the change in the processing equipment. New data may include types of data used to train the machine learning model, e.g., data used for training input, data used for target output, etc. In some embodiments, a relatively small volume of new data is collected, e.g., less data than is to be used to train a machine learning model. New data may designate process data generated by processing runs that occurred during a window of time after performance of a machine learning model dropped below a threshold, e.g., after a change occurred in processing equipment.

At block 425, data reduction, combination, and preprocessing operations are performed. In some embodiments, the new data does not contain enough information about possible process variations (e.g., due to the small number of substrates produced to generate new data, etc.). Certain advantageous features of the old data (e.g., process data generated during a window of time before training of a machine learning model associated with the processing equipment, data generated while performance of the machine learning model is above a threshold, etc.) may be maintained by utilizing some old data in updating the machine learning model. Advantageous features of the old data may include volume of data, process variations captured by the old data, etc. Advantageous features of the new data (e.g., information capturing the change in the processing equipment) may be captured by utilizing new data in updating the machine learning model. Selection of old data to use in the new model generation may be random. Selection of old data to be used in the new model generation may be systematic, e.g., grouping old data into different categories, then providing an amount of data from different categories (e.g., each category, each category determined to improve the model, etc.). In some embodiments, a similar total amount of data may be provided to generate a new model, partially including new data and partially including old data. Preprocessing may be performed, e.g., feature extraction, interpolation, extrapolation, normalization, data reduction, etc.

At block 426, a new model is generated. The combination of new data and old data is used as training data. In some embodiments, generation of the new machine learning model may include retraining the old model, e.g., retaining settings, configuration, etc. In some embodiments, generation of the new model may be performed by tuning parameters of the old model. In some embodiments, generation of the new machine learning model may not include retraining, and a fully new model may be generated. At block 427, accuracy of the model is validated by providing new data as validation input and verifying the accuracy of the output. If model performance is acceptable (e.g., accuracy above a threshold), the new machine learning model is put into use (e.g., applied to an active processing chamber). If model performance is not acceptable, data collection, data processing, or model generation may be performed again.

Figure 4D:
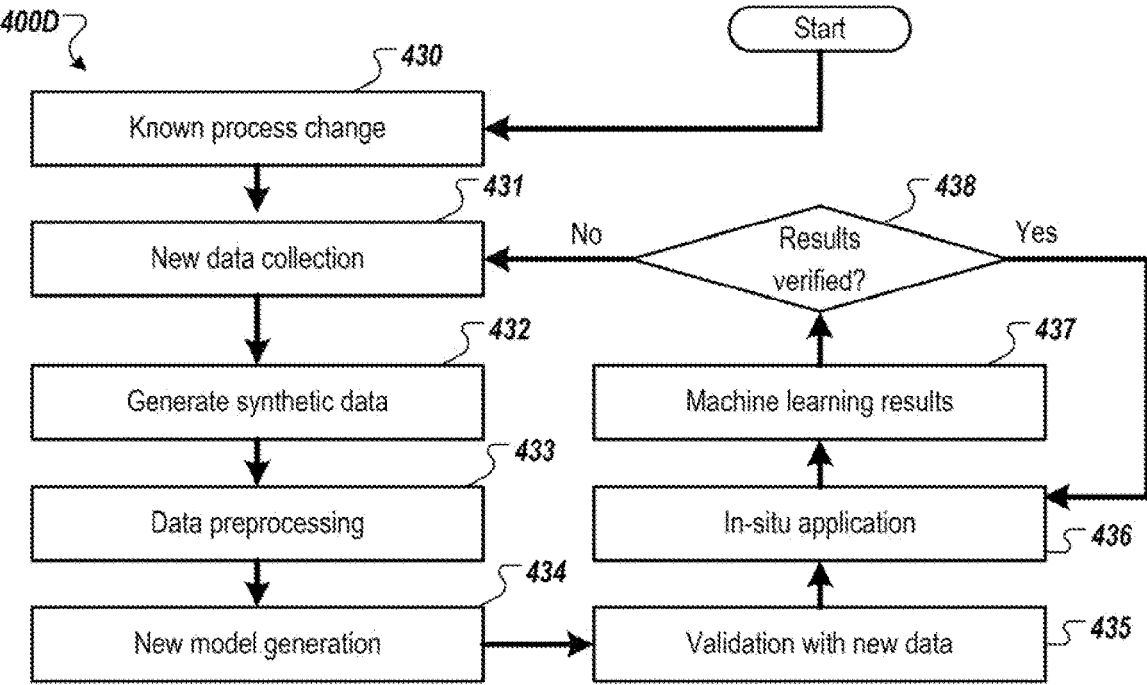

FIG. 4D is a flow diagram of a method 400D for generating a new machine learning model responsive to a sudden change in processing equipment, according to some embodiments. At block 430, a sudden change in a manufacturing process is identified. The manufacturing process is associated with one or more trained machine learning models. In some embodiments, identification may be performed by monitoring data associated with the processing equipment, e.g., sensor data, metrology data, trained machine learning model performance, etc. In some embodiments, identification may be performed by providing information indicative of a change in processing, e.g., performance of a maintenance operation, replacement of one or more components, etc.

At block 431, new data is collected. In some embodiments, some processing operations may be performed after the sudden change to the processing equipment (e.g., some processing operations may be performed and process data recorded during a window of time after a planned maintenance event). Data of the same types used to train the machine learning model may be collected, e.g., sensor data, metrology data, fault or anomaly labels, process progression data, etc. In some embodiments, less new data is generated than is to be used to train a machine learning model.

At block 432, processing logic generates synthetic data, e.g., synthetic process data. In some embodiments, synthetic data is computed to include features of both old data (e.g., old historical process data, process data associated with processing operations performed during a window of time before the change to the processing equipment, etc.) and new data (e.g., new process data, data associated with processing operations performed during a window of time after the change to the processing equipment, etc.). In some embodiments, synthetic data may be generated to include the variety of conditions described in the old data, and the differences induced by the change to the processing equipment described in the new data. In some embodiments, old data and new data of the same kind (e.g., from the same sensor, same processing operations, same product design, etc.) may be aligned (e.g., utilizing interpolation, extrapolation, truncating, etc., such that data points in the two data sets align). Values of each data point may be subtracted, generating a difference data set representing a change between the old and new data. In some embodiments, a portion of the difference data (e.g., the difference data set multiplied by a number between 0 and 1) may be added to the old data, to generate a data set including some features of both old and new data. In some embodiments, many data sets may be generated in this way, using a range of multipliers (e.g., each data set may use a random or pseudorandom number multiplier between 0 and 1). At block 433, data preprocessing is performed. Data preprocessing may include many similar operations to data preprocessing operations of block 425 of FIG. 4C.

At block 434, new machine learning model generation operations are performed. Synthetic data may be utilized for new model generation. New model generation may have many features in common with operations of block 424 of FIG. 4C. The new machine learning model may be generated utilizing the old machine learning model, or generated without utilizing aspects of the old machine learning model.

At block 435, new data is utilized to perform validation of the new trained machine learning model. In some embodiments, results and statistics from training data and validation data may be analyzed, compared, etc., to determine the accuracy, efficiency, etc., of the new model.

At block 436, the model is applied in-situ to production, e.g., is utilized to generate predictive data, process control data, or the like for the associated processing equipment. At block 437, results from the new machine learning model are collected and analyzed. At block 438, a determination may be made associated with results from the new machine learning model. Whether the new machine learning model is performing adequately (e.g., accuracy of predictions meet a threshold) may be determined. If results are verified (e.g., found to be sufficiently accurate), flow returns to block 436 and the new machine learning model is used further. If results are not verified, flow returns to block 431 and additional new data (e.g., for training the new machine learning model) is collected.

Figure 5:
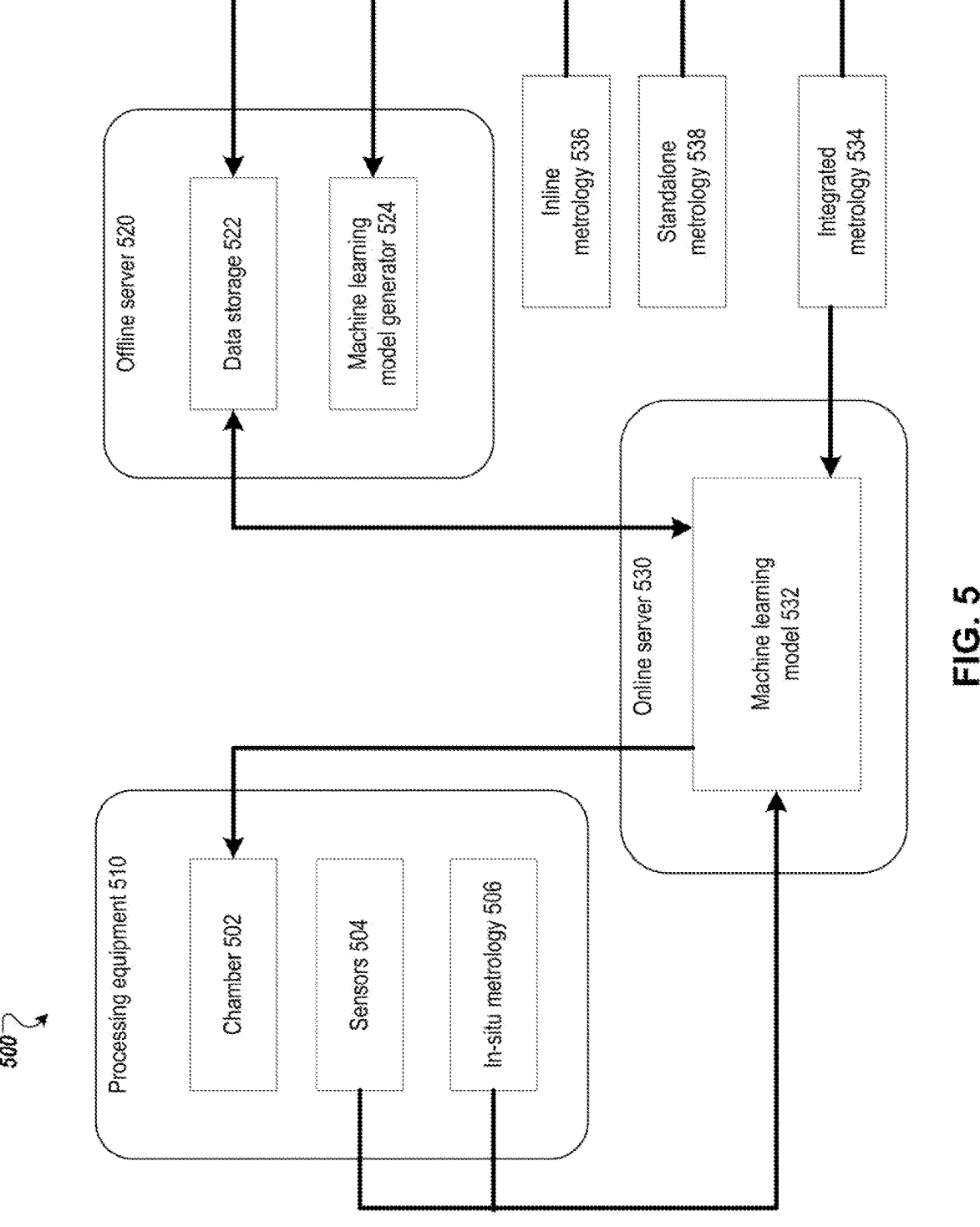
FIG. 5 is a block diagram of an exemplary system for machine learning model generation and updating, according to some embodiments.

FIG. 5 is a block diagram of an exemplary system 500 for machine learning model generation and updating, according to some embodiments. System 500 includes processing equipment 510, online server 530, and offline server 520. Processing equipment 510 may include a processing chamber 502, sensors 504 for measuring conditions in processing chamber 502, measuring properties of a substrate under processing, etc., and an in-situ metrology system 506 for measuring and/or calculating metrology data of a substrate under processing. In-situ metrology may include any system configured to measure or estimate, based on related measurements, metrology data of a substrate during processing. In-situ metrology system 506 may include a spectrometer for collecting reflectance spectra from a substrate. Data associated with processing conditions and progress may be provided to machine learning model 532, hosted by online server 530. In some embodiments, machine learning model 532 may provide process control instructions to chamber 502. In some embodiments, machine learning model 532 may generate predictive data, e.g., predictive metrology data. Output of machine learning model 532 may be provided to data storage 522 for later use, e.g., in verification of model accuracy. Machine learning model 532 may also receive data from integrated metrology system 534. Integrated metrology systems include systems configured to measure metrology after processing. Integrated metrology systems may be configured to measure metrology of a substrate under vacuum, e.g., before the substrate is removed from the processing environment. Integrated metrology system 534 may provide data to offline server 520.

Further metrology systems such as inline metrology system 536 and standalone metrology system 538 may also contribute data to offline server 520. Inline metrology systems may include metrology systems coupled to a processing chamber. Inline metrology may be performed outside of a vacuum environment, e.g., as a substrate leaves a processing environment. Standalone metrology systems may include more thorough metrology measuring equipment, e.g., equipment not coupled to the processing chamber, etc. Offline server 520 may include data storage 522 and machine learning model generator 524. Machine learning model generator 524 may perform operations including machine learning output verification (e.g., ensuring machine learning model output is above a threshold accuracy), model generation and training, model validation and testing, etc. Machine learning model generator 524 may provide a trained machine learning model to online server 530, e.g., to be used for process control operations. Machine learning model generator 524 may supply new and/or updated machine learning models to online server 530, e.g., if machine learning model output accuracy drops below a threshold value.

Figure 6:
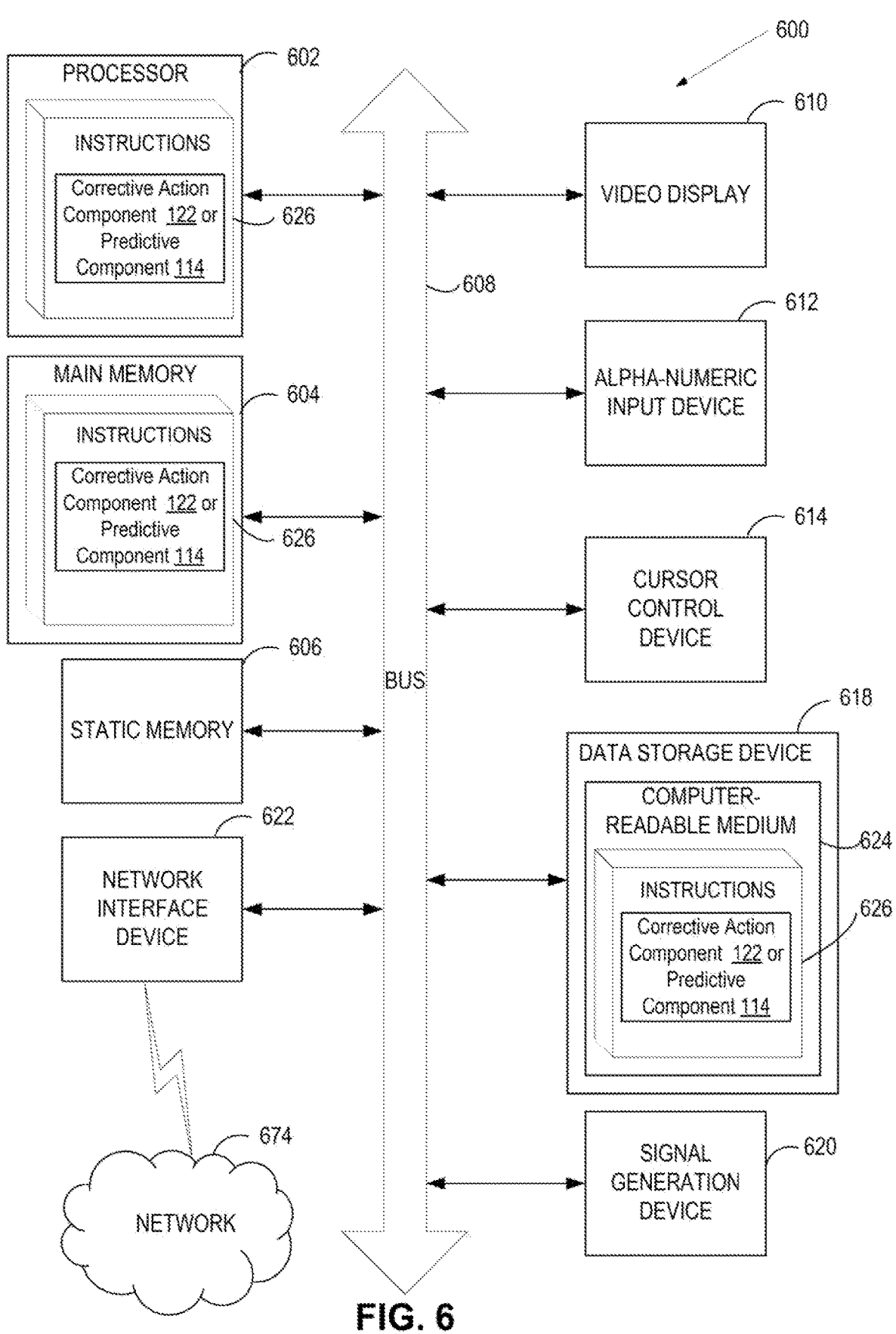
FIG. 6 is a block diagram illustrating a computer system, according to some embodiments.

FIG. 6 is a block diagram illustrating a computer system 600, according to some embodiments. In some embodiments, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 618, which may communicate with each other via a bus 608.

Processing device 602 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 600 may further include a network interface device 622 (e.g., coupled to network 674). Computer system 600 also may include a video display unit 610 (e.g., an LCD), an alphanumeric input device 612 (e.g., a keyboard), a cursor control device 614 (e.g., a mouse), and a signal generation device 620.

In some embodiments, data storage device 618 may include a non-transitory computer-readable storage medium 624 (e.g., non-transitory machine-readable medium) on which may store instructions 626 encoding any one or more of the methods or functions described herein, including instructions encoding components of FIG. 1 (e.g., predictive component 114, corrective action component 122, model 190, etc.) and for implementing methods described herein.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," "reducing," "generating," "correcting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

What is claimed is:

1. A method, comprising:

determining that performance metrics of a processing chamber have changed since a trained machine learning model associated with the processing chamber was trained, wherein the trained machine learning model is configured to receive as input sensor data associated with a process of the processing chamber and produce as output a first indication of performance of the processing chamber;

determining whether a change in the performance metrics of the processing chamber is a gradual change or a sudden change;

if the change in the performance metrics of the processing chamber is a gradual change, performing a first training process to generate a new trained machine learning model configured to receive input sensor data of the processing chamber and produce as output a second indication of performance of the processing chamber after the gradual change; and if the change in the performance metrics of the processing chamber is a sudden change, performing a second training process to generate the new trained machine learning model configured to receive as input sensor data of the processing chamber and produce as output a third indication of performance of the processing chamber after the sudden change, wherein the second training process is different from the first training process, and wherein the second training process comprises generating synthetic training data, for performing the second training process, based on adjusting historical process data collected before the sudden change according to one or more differences in process data caused by the sudden change.

2. The method of claim 1, wherein the first training process comprises:

receiving first process data generated within a first window of time, wherein the first window of time comprises a time when data used to train the trained machine learning model was generated;

receiving second process data generated within a second window of time, wherein the second window of time comprises a time after data used to train the trained machine learning model was generated;

generating a training dataset comprising the first process data and the second process data; and training the trained machine learning model using the training dataset to generate the new trained machine learning model, wherein the output of the new trained machine learning model comprises a second indication of performance of the processing chamber, and wherein the second indication of performance generated by the new trained machine learning model is more accurate than first indication of performance generated by the trained machine learning model.

3. The method of claim 2, wherein training the trained machine learning model comprises generating weights to be applied to the training dataset, wherein data from the second process data is weighted to have a more significant impact upon the training of the new trained machine learning model than data from the first process data.

4. The method of claim 2, further comprising:

receiving new process data, wherein the new process data is associated with a processing run occurring after generation of the new trained machine learning model;

providing the new process data to the new trained machine learning model;

receiving output from the new trained machine learning model; and performing a corrective action in view of the output.

5. The method of claim 1, wherein the second training process further comprises:

generating the synthetic training data based on (i) old historical process data associated with products processed before the change to the processing chamber and (ii) new process data associated with products processed after the change to the processing chamber;

generating a training dataset comprising the synthetic training data; and training a new machine learning model using the training dataset to generate the new machine learning model, wherein the new machine learning model is configured to output a second indication of performance of the processing chamber, and wherein the second indication of performance of the processing chamber output by the new machine learning model is more accurate than the first indication of performance of the processing chamber output by the trained machine learning model.

6. The method of claim 5, wherein generating synthetic process data comprises:

calculating one or more differences between old historical process data and new process data; and utilizing the one or more differences to generate synthetic process data.

7. The method of claim 6, wherein calculating one or more differences comprises:

aligning data such that each data point of the old historical process data has a corresponding data point of the new process data; and subtracting data values of each data point of one set of process data from the other to generate difference data, and wherein generating synthetic process data comprises:

generating a random or pseudorandom number between zero and one;

multiplying the random or pseudorandom number by the difference data; and summing the product of the random or pseudorandom number and the difference data with the historical process data.

8. The method of claim 5, further comprising:

receiving new process data, wherein the new process data is associated with a processing run occurring after generation of the new machine learning model;

providing the new process data to the new machine learning model;

receiving output from the new machine learning model; and performing a corrective action in view of the output.

9. The method of claim 1, wherein the gradual change in the performance metrics of the processing chamber comprises one or more of:

a gradual change in performance of one or more chamber components; or a gradual change to input materials to be processed by the processing chamber.

10. The method of claim 1, wherein the sudden change in the performance metrics of the processing chamber is caused by one or more of:

replacing a component of the processing chamber;

performing maintenance on the processing chamber;

a change in a process recipe enacted in the processing chamber;

a change in a design of products produced using the processing chamber; or a change in input materials to be processed in the processing chamber.

11. The method of claim 1, wherein the input sensor data comprises in-situ spectral data of a substrate in the processing chamber, and wherein the first indication of performance of the processing chamber comprises an indication of progress of a processing operation.

12. A system, comprising memory and a processing device coupled to the memory, wherein the processing device is configured to:

determine that performance metrics of a processing chamber have changed since a trained machine learning model associated with the processing chamber was trained, wherein the trained machine learning model is configured to receive as input sensor data associated with a process of the processing chamber and produce as output a first indication of performance of the processing chamber;

determine whether a change in the performance metrics of the processing chamber is a gradual change or a sudden change;

if the change in the performance metrics of the processing chamber is a gradual change, perform a first training process to generate a new trained machine learning model configured to receive input sensor data of the processing chamber and produce as output a second indication of performance of the processing chamber after the gradual change; and if the change in the performance metrics of the processing chamber is a sudden change, perform a second training process to generate the new trained machine learning model configured to receive as input sensor data of the processing chamber and produce as output a third indication of performance of the processing chamber after the sudden change, wherein the second training process is different from the first training process, and wherein the second training process comprises generating synthetic training data for performing the second training process that is based on adjusting historical process data collected before the sudden change based on one or more differences in process data caused by the sudden change.

13. The system of claim 12, wherein the first training process comprises:

receiving first process data generated within a first window of time, wherein the first window of time comprises a time before training of the trained machine learning model;

receiving second process data generated within a second window of time, wherein the second window of time comprises a time after training the trained machine learning model;

generating a training dataset comprising the first process data and the second process data; and training the trained machine learning model using the training dataset to generate the new trained machine learning model, wherein the output of the new trained machine learning model comprises a second indication of performance of the processing chamber, and wherein the second indication of performance generated by the new trained machine learning model is more accurate than the first indication of performance generated by the trained machine learning model.

14. The system of claim 13, wherein training the new trained machine learning model comprises generating weights to be applied to the training dataset, wherein data from the second process data is weighted to have a more significant impact upon the training of the new trained machine learning model than data from the first process data.

15. The system of claim 12, wherein the second training process further comprises:

generating synthetic process data based on (i) old historical process data associated with products processed before the change to the processing chamber and (ii) new process data associated with products processed after the change to the processing chamber;

generating a training dataset comprising the synthetic process data; and training a new machine learning model using the training dataset to generate the new trained machine learning model, wherein the new machine learning model is configured to output a second indication of performance of the processing chamber, and wherein the second indication of performance of the processing chamber output by the new machine learning model is more accurate than the first indication of performance of the processing chamber output by the trained machine learning model.

16. The system of claim 15, wherein generating synthetic process data comprises:

calculating one or more differences between old historical process data and new process data; and utilizing the one or more differences to generate synthetic process data.

17. A non-transitory machine-readable storage medium storing instructions which, when executed, cause a processing device to perform operations comprising:

determining that performance metrics of a processing chamber have changed since a trained machine learning model associated with the processing chamber was trained, wherein the trained machine learning model is configured to receive as input sensor data associated with a process of the processing chamber and produce as output a first indication of performance of the processing chamber;

determining whether a change in the performance metrics of the processing chamber is a gradual change or a sudden change;

if the change in the performance metrics of the processing chamber is a gradual change, performing a first training process to generate a new trained machine learning model configured to receive input sensor data of the processing chamber and produce as output a second indication of performance of the processing chamber after the gradual change; and if the change in the performance metrics of the processing chamber is a sudden change, performing a second training process to generate the new trained machine learning model configured to receive as input sensor data of the processing chamber and produce as output a third indication of performance of the processing chamber after the sudden change, wherein the second training process is different from the first training process, and wherein the second training process comprises generating synthetic training data for performing the second training process that is based on adjusting historical process data collected before the sudden change based on one or more differences in process data caused by the sudden change.

18. The non-transitory machine-readable storage medium of claim 17, wherein the first training process comprises:

receiving first process data generated within a first window of time, wherein the first window of time comprises a time when data used to train the trained machine learning model was generated;

receiving second process data generated within a second window of time, wherein the second window of time comprises a time after data used to train the trained machine learning model was generated;

generating a training dataset comprising the first process data and the second process data; and training the trained machine learning model using the training dataset to generate the new trained machine learning model, wherein the output of the new machine learning model is more accurate than the output of the trained machine learning model.

19. The non-transitory machine-readable storage medium of claim 17, wherein the second training process further comprises:

generating synthetic process data based on (i) old historical process data associated with products processed before the change to the processing chamber and (ii) new process data associated with products processed after the change to the processing chamber;

generating a training dataset comprising the synthetic process data; and training a new machine learning model using the training dataset to generate the new machine learning model, where output of the new machine learning model is more accurate than output of the trained machine learning model.

20. The non-transitory machine-readable storage medium of claim 19, wherein generating synthetic process data comprises:

calculating one or more differences between new process data and historical process data; and utilizing the one or more differences to generate synthetic process data.

* * * * *